United States Patent [19]

Ueda et al.

[11] Patent Number: 5,009,840
[45] Date of Patent: Apr. 23, 1991

[54] FUEL ASSEMBLY FOR NUCLEAR REACTOR

[75] Inventors: Makoto Ueda; Yoshihira Ando; Shungo Sakurai; Ritsuo Yoshioka, all of Yokohama, Japan

[73] Assignee: Kabushiki Kaisha Toshiba, Kawasaki, Japan

[21] Appl. No.: 299,238

[22] Filed: Jan. 19, 1989

[30] Foreign Application Priority Data

Jan. 23, 1988 [JP] Japan ............................ 63-11872
Mar. 22, 1988 [JP] Japan ............................ 63-65735
Apr. 1, 1988 [JP] Japan ............................ 63-78080

[51] Int. Cl.$^5$ ............................ G71C 3/32
[52] U.S. Cl. ............................ 376/435; 376/420; 376/428; 376/173
[58] Field of Search ........... 376/435, 428, 420, 173

[56] References Cited

U.S. PATENT DOCUMENTS

| | | | |
|---|---|---|---|
| 3,145,149 | 9/1964 | Imhoff | 176/54 |
| 3,212,983 | 10/1965 | Kornbichler | 176/42 |
| 4,273,616 | 6/1981 | Andrews | 176/68 |
| 4,687,629 | 9/1987 | Mildrum | 376/428 |
| 4,968,479 | 11/1990 | Ogiya et al. | 376/428 |

FOREIGN PATENT DOCUMENTS 61-165681 7/1986 Japan .

Primary Examiner—Brooks H. Hunt
Assistant Examiner—N. Bhat
Attorney, Agent, or Firm—Foley & Lardner

[57] ABSTRACT

A fuel assembly for a nuclear reactor comprising a number of fuel rods arranged in a regular fashion in a channel box which is surrounded by water gap in a reactor core. Some of fuel rods disposed at portions facing the water gap through which no control blade is inserted or drawn out, have atomic number densities of fissionable material contained in the fuel rods. The atomic number density of each of these fuel rods is made smaller than that of the fuel rod disposed in the fuel assembly at portions other than the portions referred to above.

11 Claims, 24 Drawing Sheets

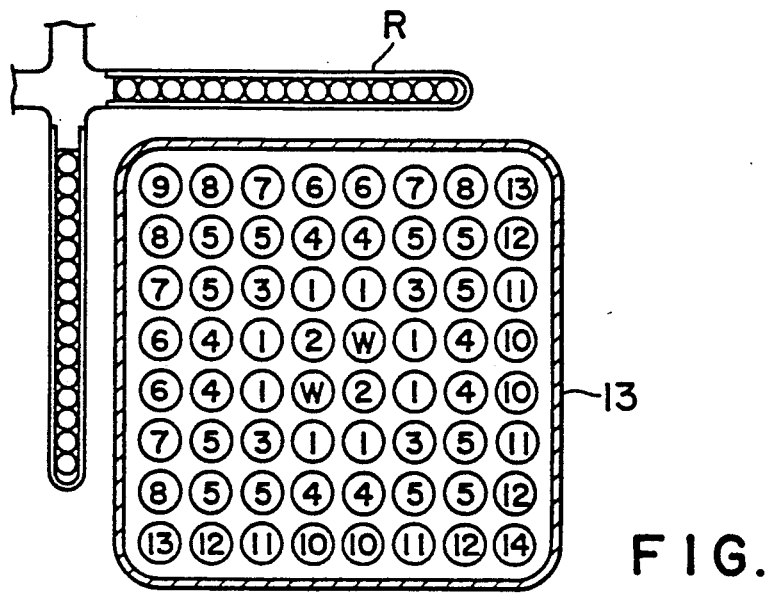
FIG. IA
| NO. OF FUEL RODS | ENRICHMENT (wt. %) | | | |
|---|---|---|---|---|
| | CASE 1 | CASE 2 | CASE 3 | CASE 4 |
| 1 | 4.5 | 5.0 | 5.4 | 5.8 |
| 2 | 3.6 | 4.0 | 4.4 | 4.6 |
| 3 | 4.4 | 4.8 | 5.2 | 5.5 |
| 4 | 3.9 | 4.2 | 4.5 | 5.0 |
| 5 | 3.4 | 3.8 | 4.2 | 4.7 |
| 6 | 2.8 | 2.2 | 1.6 | 1.2 |
| 7 | 2.6 | 2.1 | 1.6 | 1.2 |
| 8 | 2.3 | 1.9 | 1.5 | 0.8 |
| 9 | 1.9 | 1.5 | 1.3 | 0.6 |
| 10 | 1.8 | 1.2 | 0.6 | 0.0 |
| 11 | 1.6 | 1.1 | 0.6 | 0.0 |
| 12 | 1.3 | 0.9 | 0.5 | 0.0 |
| 13 | 1.4 | 1.0 | 0.8 | 0.3 |
| 14 | 0.9 | 0.5 | 0.3 | 0.0 |
| AVERAGE OF ALL FUEL RODS | 3.0 | 3.0 | 3.0 | 3.0 |
| FIRST LAYER (CONTROL BLADE SIDE) | 2.5 | 2.0 | 1.5 | 1.0 |
| FIRST LAYER (NO CONTROL BLADE SIDE) | 1.5 | 1.0 | 0.5 | 0.0 |
FIG. IB

| NO. OF FUEL RODS | ENRICHMENT ( wt. % ) | | | | |
|---|---|---|---|---|---|
| | REFERENCE | CASE 1 | CASE 2 | CASE 3 | CASE 4 |
| 1 | 4.5 | 4.5 | 5.0 | 5.4 | 5.8 |
| 2 | 4.2 | 3.6 | 4.0 | 4.4 | 4.6 |
| 3 | 3.8 | 4.4 | 4.8 | 5.2 | 5.5 |
| 4 | 3.2 | 3.9 | 4.2 | 4.5 | 5.0 |
| 5 | 2.6 | 3.4 | 3.8 | 4.2 | 4.7 |
| 6 | 2.9 | 2.3 | 1.7 | 1.1 | 0.6 |
| 7 | 2.8 | 2.1 | 1.6 | 1.1 | 0.6 |
| 8 | 2.3 | 1.8 | 1.4 | 1.0 | 0.4 |
| 9 | 1.9 | 1.4 | 1.0 | 0.8 | 0.3 |
| AVERAGE OF ALL FUEL RODS | 3.0 | 3.0 | 3.0 | 3.0 | 3.0 |
| AVERAGE OF FIRST LAYER FUEL RODS | 2.6 | 2.0 | 1.5 | 1.0 | 0.6 |

FUEL ASSEMBLY FOR NUCLEAR REACTOR

BACKGROUND OF THE INVENTION

This invention relates to a fuel assembly for a nuclear reactor and more particularly to fuel assembly for a boiling water reactor capable of ensuring a long operation cycle and maintaining a high shut-down margin.

A fuel assembly for a boiling water reactor (BWR) is constructed by a square channel box in which a number of fuel rods each comprising a metal cladding tube in which neclear fuel material is packed, are regularly arranged. The reactor core of the BWR includes a plurality of cells each comprising a cruciform control blade and four fuel assemblies surrounding the control blade and these cells are arranged in a regulated manner in the core. Namely, each fuel assembly and control blade have axes perpendicular and parallel to each other, and a coolant functioning as moderator flows from the lower portion towards the upper portion of the reactor core.

Concerning the BWR, steam voids are not formed in the portion near the lower end of the active core region, i.e., the lower end of a heat generating portion at which an exothermic reaction is performed, but many voids are generated at the area above the central portion of the reactor core, and the generated voids move up towards the upper portion of the reactor core. Accordingly, the void fraction in the BWR becomes high towards the upper portion of the reactor core, and as a result, the moderation characteristics of neutrons are lowered and hence the output power is also lowered. In order to obviate these defects, in a conventional technique, increasing the enrichment of the fissile nuclides to be contained in the fuel at portions with a high void fraction has been performed, and mixing a burnable poison with the fuel element to suppress the increasing in the power output at a portion of low void fraction has also been performed.

For the reasons described above, in the BWR, the burn-up at the upper portion of the core is liable to be delayed, and hence the concentration of U-235 becomes relatively higher than that of other portions of the core. In addition, since a fissile nuclide such as Pu-239 is produced relatively in higher rate at the upper portion of the core due to neutron-spectral hardening through higher void fraction compared with those at the lower portion, it is difficult to maintain the shut-down margin of the reactor core at the upper portion thereof. Moreover, recently, many efforts have been made for elongating the operation cycle of the reactor and for extending the brun-up of the fuel in order to satisfy the economic requirements. In these cases, however, the enrichment of the fuel is necessarily increased, so that the subcriticality at the upper portion of the reactor core is further reduced and the maintenance of the shut-down margin of the reactor is made more difficult. These technical defects resulted in difficulty of ensuring a long operation cycle for nuclear reactor cores of the conventional type. Moreover, to make the subcriticality during reactor shut-down period larger to ensure the maintenance of the reactor shut-down margin, it is effective to minimize the difference obtained by subtracting the infinite multiplication factor during the power operation period from that during the cold operation period, i.e., the difference of the reactivities at these operation periods. For the reason described above, there is provided a method for improving the reactor shut-down margin by reducing the enrichment of the fuel rods in the first layer of the fuel assembly (i.e., fuel rods arranged along the inner wall of the channel box), for example, as disclosed in Japanese Patent Publication No. 49946/1987.

However, with the conventional method described above, no consideration is paid for the worth of the control rods or blades to be inserted into the reactor core at the reactor shut-down time, and hence, the method is not sufficient for the improvement of the reactor shut-down margin.

SUMMARY OF THE INVENTION

An object of this invention is to substantially eliminate the drawbacks and defects encountered in the conventional technique described above, and to provide an improved fuel assembly that forms a reactor core of a light water reactor, and that is capable of ensuring the maintenance of reactor shut-down margin even during an increase in the enrichment of a fuel, and improving an axial output power distribution in particular.

This and other objects can be achieved in one aspect according to this invention by providing a fuel assembly for a nuclear reactor in which a number of fuel rods are regularly arranged, and characterized in that the atomic number density of a fissionable material contained in each of the fuel rods arranged at a portion in the fuel assembly facing a water gap through which a control blade is not inserted or drawn out, is made smaller than the atomic number density of a fissionable material contained in each of the fuel rods arranged at a portion other than the portion referred to above.

In another aspect, according to this invention, there is provided a fuel assembly for a nuclear reactor in which a number of fuel rods each containing a fuel material in a metal cladding tube are regularly arranged, and characterized in that some of the fuel rods are provided with interposed members in the cladding tubes and each of the interposed members has a predetermined axial length and has a significantly reduced enrichment of a fissile nuclide, the axial length thereof being equal to or more than the thermal neutron diffusion length during the reactor power operation period, an axial level of the location of the interposed member in the fuel rod being designed so as to occupy a position including an area at which subcriticality is made small at a period in which the maintenance of the reactor shut-down margin is inhibited during the reactor operation period and the fuel rods provided with the interposed members are arranged at least at the outer peripheral portion of the fuel assembly.

According to the fuel assemblies for the nuclear reactor described above, in one aspect, the relative output of the fuel rods facing the control blade is made larger, and hence, the worth of the control blade can be improved. Accordingly, the average output of the fuel rods adjacent to the water gap is made smaller. The reactor shut-down margin can be improved by reducing the difference in reactivity between the power operation (hot) period and the cold operation period. In another aspect, the arrangement of the fuel rods provided with the interposed members at a predetermined position in the fuel assembly substantially results in the enlargement of the water gap between adjacent fuel assemblies in the reactor core. Moreover, the multiplication factor is lowered during the reactor shut-down period, and the lowering of the multiplication factor can be recovered during the hot operation period.

The preferred embodiments according to this invention will be described in further detail hereinafter with reference to the accompanying drawings.

BRIEF DESCRIPTION OF THE DRAWINGS

In the accompanying drawings:

FIG. 1A is a plan view of the first embodiment according to this invention;

FIG. 1B is a table showing the enrichments of the respective fuel rods shown in FIG. 1A;

DESCRIPTION OF THE PREFERRED EMBODIMENTS

Figure 4:
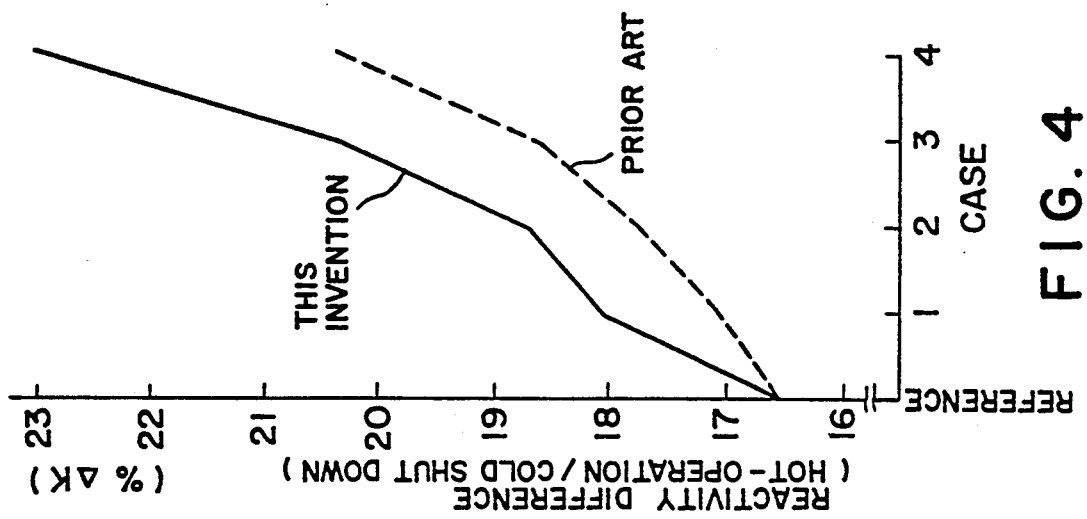
FIGS. 2 to 4 are graphs representing the worth of the control blades during the cold operation period according to this invention and the conventional art, the reactivity difference at the power (hot) operation period and the cold operation period, and the reactivity difference at the power (hot) operation period and the cold shut-down period, respectively.

FIG. 1A is a plan view representing the first embodiment according to this invention, in which reference numerals 1 to 14 designate fuel rods having enrichments different from each other, and the enrichments of the respective fuel rods 1 to 14 are shown in Table of FIG. 1B. The fuel rods are arranged in a regular fashion in a channel box 13 (eight rows and eight lines in the illustrated embodiment). As can be seen from the Table of FIG. 1B, the average enrichment of the fuel rods (6, 7, 8, 9, 10, 11, 12, 13, 14) of the first layer arranged adjacent to a water gap is smaller than that of the fuel rods as a whole, but the average enrichment of the fuel rods (6, 7, 8, 9) of the first layer arranged on the side of a water gap into which a control blade R is inserted, is set to be larger than that of the fuel rods (10, 11, 12, 14) on the side of a water gap into which the control blade is not inserted.

Figure 3:
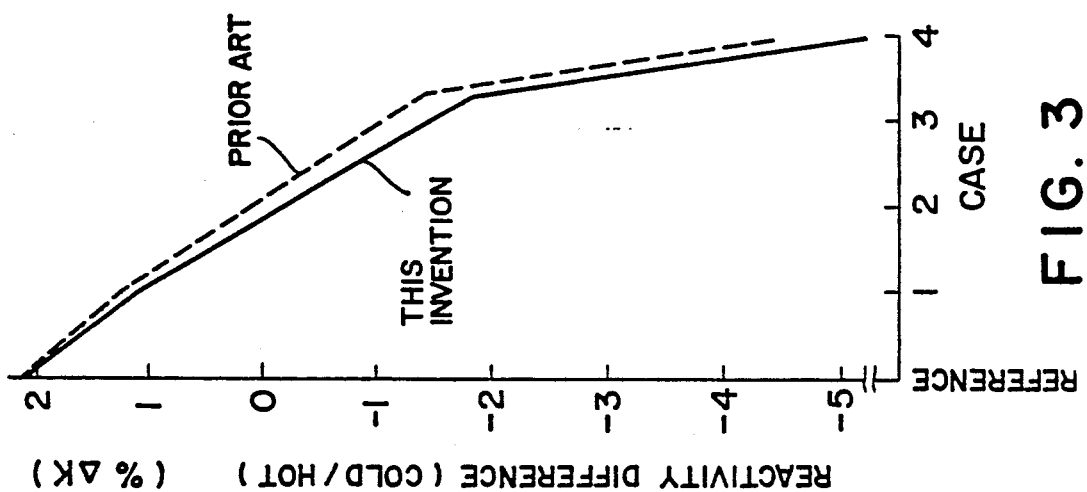
Figure 2:
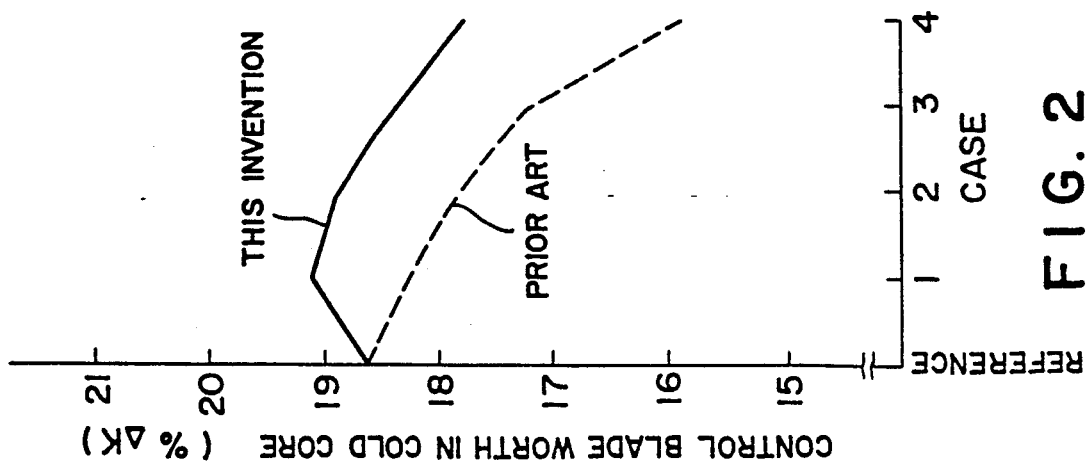
Figures 40A, 40B:
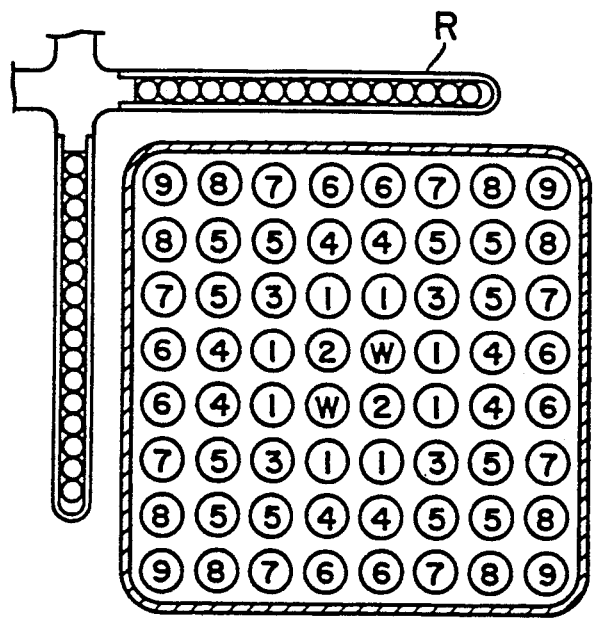
FIG. 40A is a plan view showing one example of a conventional fuel assembly.
FIG. 40B is a table showing the enrichments of the fuel rods shown in FIG. 40A.

FIGS. 2 to 4 are graphs showing the effects attained by the first embodiment of this invention, and indicating the results of the comparison of this embodiment with the prior art for the worth of the control blade at the cold operation period, the difference in reactivity between the power operation period and the cold operation period, and the difference in reactivity between the power operation period and the cold operation-shutdown period with respect to cases 1 to 4 shown in the Table of FIG. 1B. As the prior art for this comparison, is utilized an example shown in FIG. 40 which is disclosed in the aforementioned Japanese Patent Publication No. 49946/1987 as a preferred embodiment.

In detail, FIG. 2 shows the result of the comparison for the worth of the control blade during the cold operation period. As is apparent from FIG. 2, regarding cases 1 and 2, the solid line representing this embodiment indicates an increase in the worth of the control blade with respect to the reference example, but in cases 3 and 4, the worth as indicated by the solid line decreases slightly with respect to that of the reference. This is based on the fact that in this embodiment, the enrichments of the fuel rods facing the control blade R are set to be considerably small (in case 3: to 60%; in case 4: to about 40%) in comparison with the reference example in accordance with an increase in the case numbers. On the contrary, the dotted line representing the prior art example simply decreases in the worth of the control blade with respect to the reference example in accordance with the increase in the case numbers.

FIG. 3 shows a graph for comparing the difference in reactivity at the cold operation period and the power operation period, and the value of the graph is defined as the infinite multiplication factor of the cold core minus that of the hot core. From FIG. 3, it can be seen that the difference is made systematically smaller in this embodiment in comparison with the conventional example, and that this embodiment is also superior as regards the difference in reactivity between the cold operation period and the power operation period in comparison with the conventional example.

FIG. 4 shows a comparison of the difference in reactivity at the power operation period and the cold shut down period. The increasing in the value of this difference means the improvement of the reactor shut-down margin, and this value is defined as the infinite multiplication factor of the hot operating core minus that of the cold shut-down core. Namely, it can be seen that this embodiment is more effective for the improvement of the reactor shut down margin when compared with the conventional example.

Figure 5:
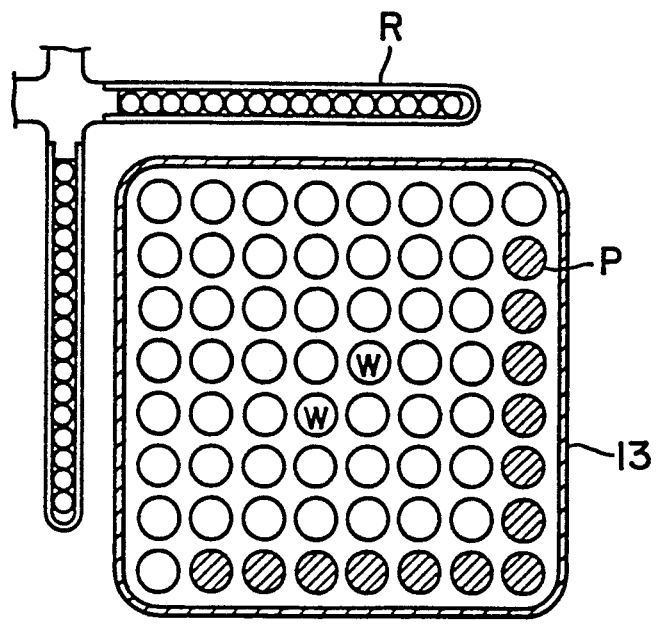
FIG. 5 is a plan view of the second embodiment according to this invention.

FIG. 5 is a plan view showing another embodiment according to this invention, in which the fuel rods P designated by the hatching, are constructed as hollow fuel rods each having a small stack density.

In this embodiment, the fuel rods P opposing the water gap on the side into which the control blade R is not inserted, are bored to form hollow portions therein, into which a chemically stable substance having a small neutron cross section such as $Al_2O_3$ or $ZrO_2$ is packed to reduce the atomic number density of the fissionable material of the fuel rods to be smaller than that of the fuel rods arranged in the other area.

Figure 8:
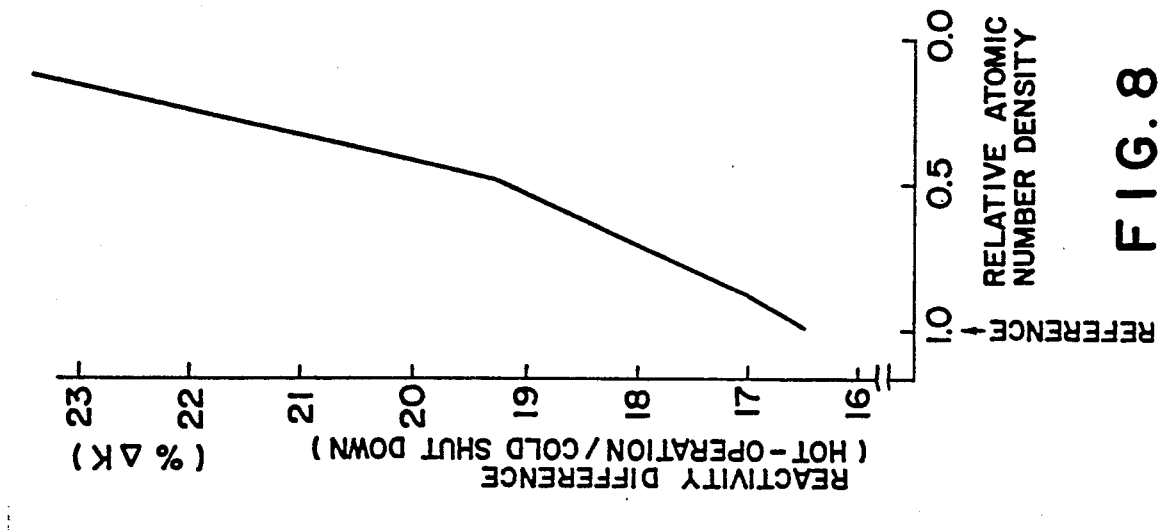
FIGS. 6 to 8 are graphs respectively representing the worth of the control blade on the basis of embodiment shown in FIG. 5 during the cold operation period, the reactivity difference at the power (hot) operation period and the cold operation period, and the reactivity difference at the power (hot) operation period and the cold shut-down period.
Figure 7:
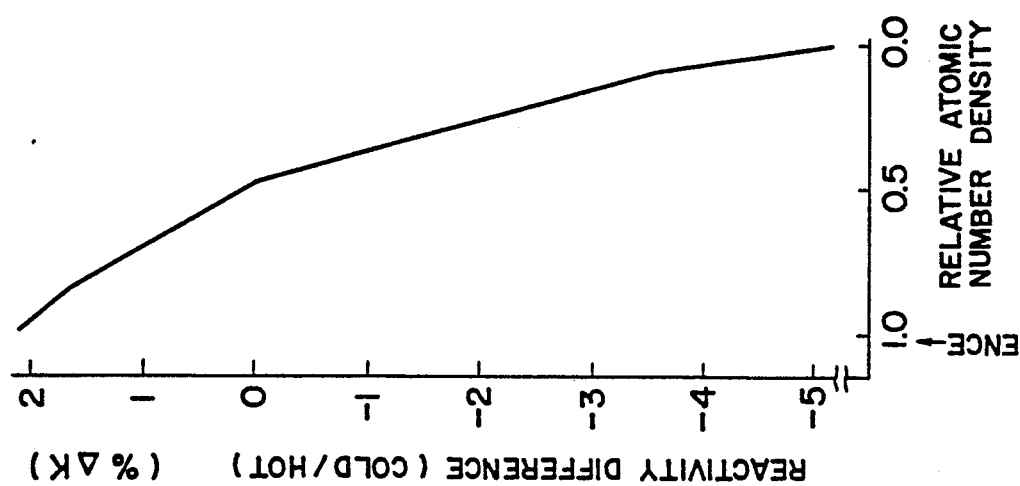
Figure 6:
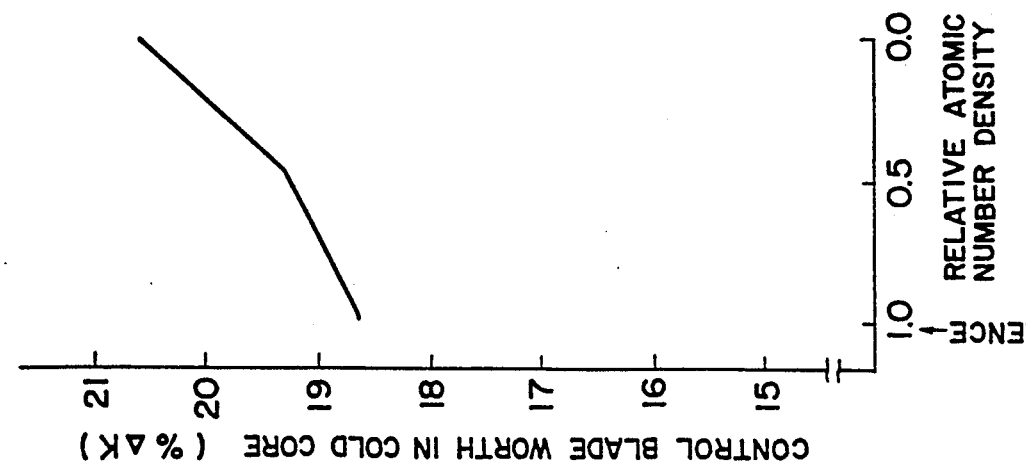

FIGS. 6 to 8 are graphs respectively representing the worth of the control blade during the cold period, the difference in reactivity at the power operation period and the cold operation period, and the difference in reactivity at the power operation period and the cold shut-down period, all for the case of varying the atomic number density in the second embodiment. In the graphs, the atomic number density 1.0 is of a value corresponding to the "Reference" in FIG. 40.

As can be seen from these graphs, the reactor shut-down margin can be effectively improved by reducing the atomic number density of the fissionable material of the fuel rods arranged at a portion opposing the water gap into which the control blade R is not inserted.

Figure 9B:
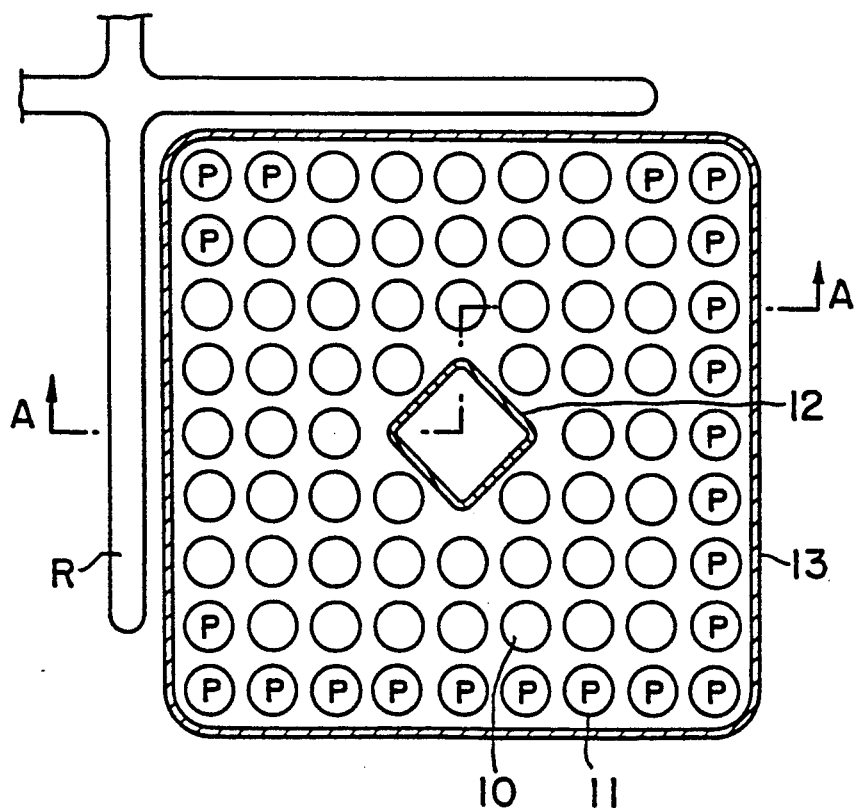
FIG. 9B is a plan view of the third embodiment.
Figure 9A:
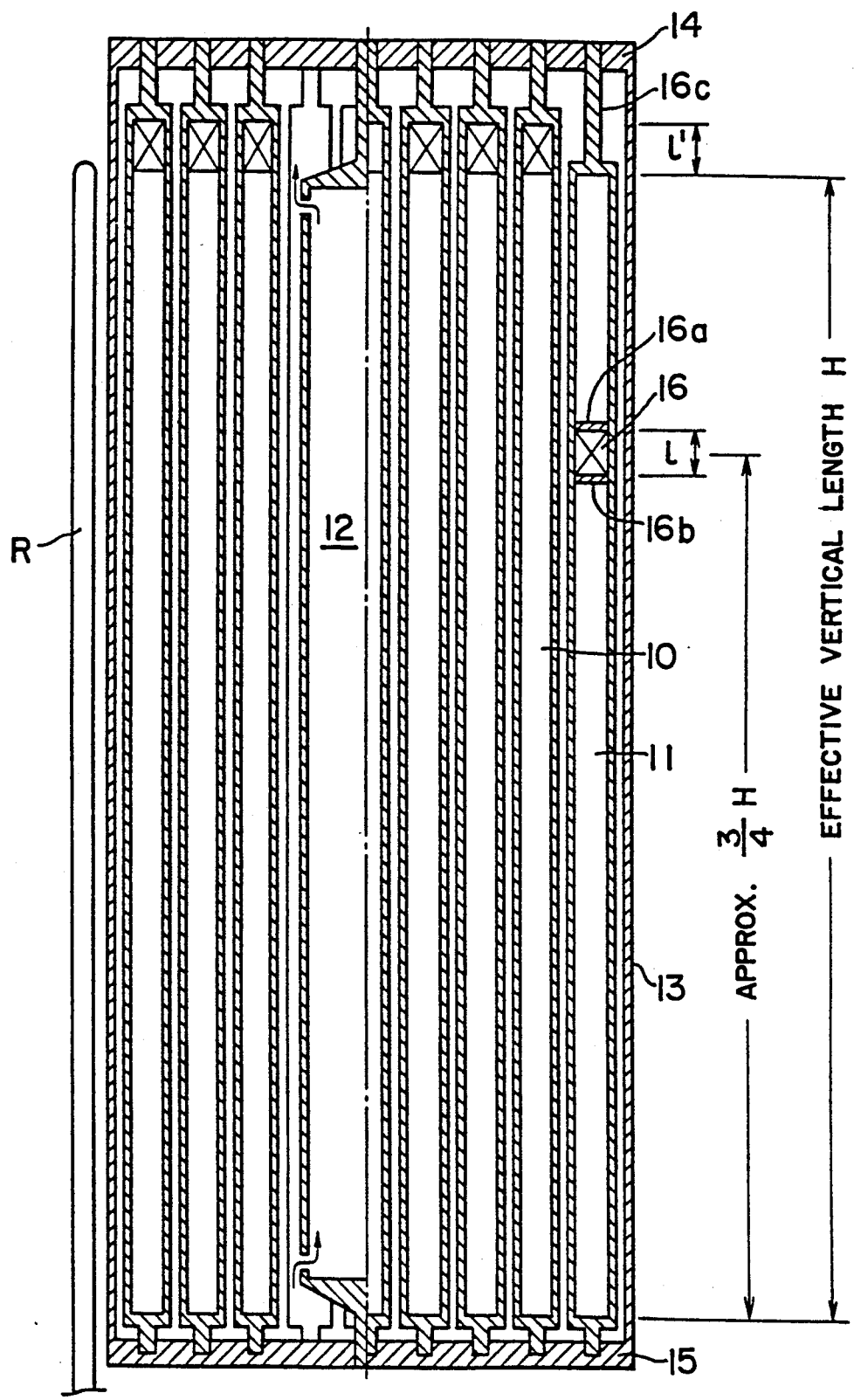
FIG. 9A is an elevational section of the third embodiment according to this invention.

FIG. 9 represents the third embodiment of a fuel assembly according to this invention and includes FIG. 9A being a vertical section of the fuel assembly and FIG. 9B being a plan view thereof.

This third embodiment applies the technique developed by the applicant of the subject application, and disclosed in Japanese Patent Application Nos. 72990/1987 and 85748/1987 (Japanese Patent Laid-Open No. 173,786, in which the multiplication factor in the cold operation period is reduced so that the reactor shut-down margin (subcriticality is therefore improved by interposing a member having a predetermined length and having a largely reduced fissionable nuclide density, into a metal cladding tube.

In detail, the fuel assembly of the third embodiment includes a water rod 12 with a square cross section and located at substantially the central portion of the fuel assembly and also includes, except for the central portion, fuel rods 10 and 11 arranged in a regular fashion in nine rows and nine lines. The fuel rods 10 and 11 are enclosed by the channel box 13 and the upper and lower ends thereof are secured by an upper tie plate 14 and a lower tie plate 15, respectively.

The fuel rods 11 are constructed as fuel rods P into which interposed members 16 are inserted. It is preferred that the suitable vertical length l of each interposed member 16 be less than one third ($\frac{1}{3}$) of the length of the effective vertical length H of the fuel, for example 15 to 60 cm in this embodiment. The central portion of the interposed member 16 is positioned at a portion apart from the lower end of the effective fuel length by a distance of $\frac{3}{4}$ H. The reason for locating the interposed member 16 at this position is that the subcriticality of the reactor core is particularly reduced around this portion distanced by about $\frac{3}{4}$ H from the bottom of effective fuel zone and within a range having a vertical length of about $\frac{1}{4}$H. Although the detail of the interposed member 16 will be described hereinafter, hollow tube, graphite, $ZrH_2$ pellets or water are typical examples of the material constituting the member to be interposed.

A power output spike suppressing member 16a, described in detail hereinafter, is located adjacent to the interposed member 16 for preventing power spiking.

As shown in FIG. 9A, in BWR, the cruciform control blade R is inserted into the water gap disposed between the adjacent fuel assemblies and withdrawn therefrom. The insertion of the control blade R makes it possible to suppress the neutron multiplication factor of the fuel rods, but the suppression is not made uniformly throughout the entire fuel assembly in that the neutron multiplication factor is largely suppressed on the side of the fuel assembly facing the control blade R, and the factor is less suppressed on the side facing the water gap through which the control blade R is not inserted or drawn out. According to this invention, this fact is viewed as significant, and for the purpose of mainly utilizing the subcriticality increasing function of the fuel rods P during the reactor shut-down period for the side into which the control blade R is not inserted, the fuel rods 11 (P-type) are arranged on the side of the water gap into which the control blade R is not inserted to effectively enlarge the water gap disposed between the adjacent fuel assemblies, not shown. According to this embodiment, since the effective width of the water gap excessively increases in addition to the existing water gap due to the arrangement of the fuel rods (P), the neutron multiplication factor is substantially lowered during the cold shut-down period (i.e., subcriticality is increased) and is recovered during the high temperature operation period, and the appropriate moderation characteristics are attained automatically due to the decrease in water density.

Three fuel rods 11 (P-type) are arranged at the corner portions of the fuel assembly of this embodiment, and facing the central axis of the cruciform control blade because the corner portion contributes relatively largely to the reduction of the multiplication factor at the reactor shut-down period and to the improvement of the multiplication factor during the reactor high temperature operation period.

The fuel assembly of this embodiment shown in FIG. 9B includes twenty-two fuel rods 11 of the P-type. A typical (or standard) fuel rod 10 has an effective length (heat generating length) of about 3.6 to 3.7 m. In the core management of the BWR, the burn-up monitoring is carried out by equally dividing the effective length of the fuel rod into twenty-four parts, so that one-twenty-fourth (1/24) length of 3.6 to 3.7 m is generally made to a unit length for the interposing member (i.e., about 15 cm being called one node) for the sake of convenience. This is of course not an essential matter.

It is now assumed that an interposing member having a length of 3 nodes (about 45 cm) is inserted into the fuel rod 10.

This length is substantially equal to the length l' of a gas plenum arranged at the top portion of a typical fuel rod 10, so that the gas plenum is not specifically disposed at the top portion of the fuel rod (P) by fully utilizing the position, into which the member to be interposed is inserted, as the gas plenum. This matter is considered for the fuel assembly shown in FIG. 9A, in which the diameter of the top portion 16c of the fuel rod is effectively reduced. The reduction in diameter results in the enlargement of the coolant flow passage area and in contributing to the reduction of the pressure drop of the coolant, whereby the stability of the channel can be improved, the capacity of a recirculation pump effectively reduced, and hence economic improvement achieved.

As described hereinbefore, the fuel assembly of this embodiment includes twenty-two fuel rods 11 of the P-type, and provided that all of these fuel rods 11 contain sections into which are respectively inserted interposing members each having a length of 3 nodes, the uranium inventory can be reduced by an amount corresponding to 2.75 fuel rods (22×3/24). In addition, according to this embodiment, the uranium inventory is reduced by an amount corresponding to five fuel rods by the square water rod located at the central portion of the fuel assembly, so that the inventory is reduced by an amount corresponding to 7.75 fuel rods. With the fuel assembly of the 9×9 type (nine rows and nine lines) such as this embodiment, a reduction of nine fuel rods has been realized using the water rod. In comparison with this, this embodiment has an uranium inventory larger by 1.25 fuel rods than that of the above described practical embodiment. This fact significantly means that the heat generation with respect to the unit area of the nuclear reactor can be increased or the power density can be effectively reduced by the corresponding amount to contribute to the improvement of the soundness of the fuel rods.

Figures 10A, 10B:
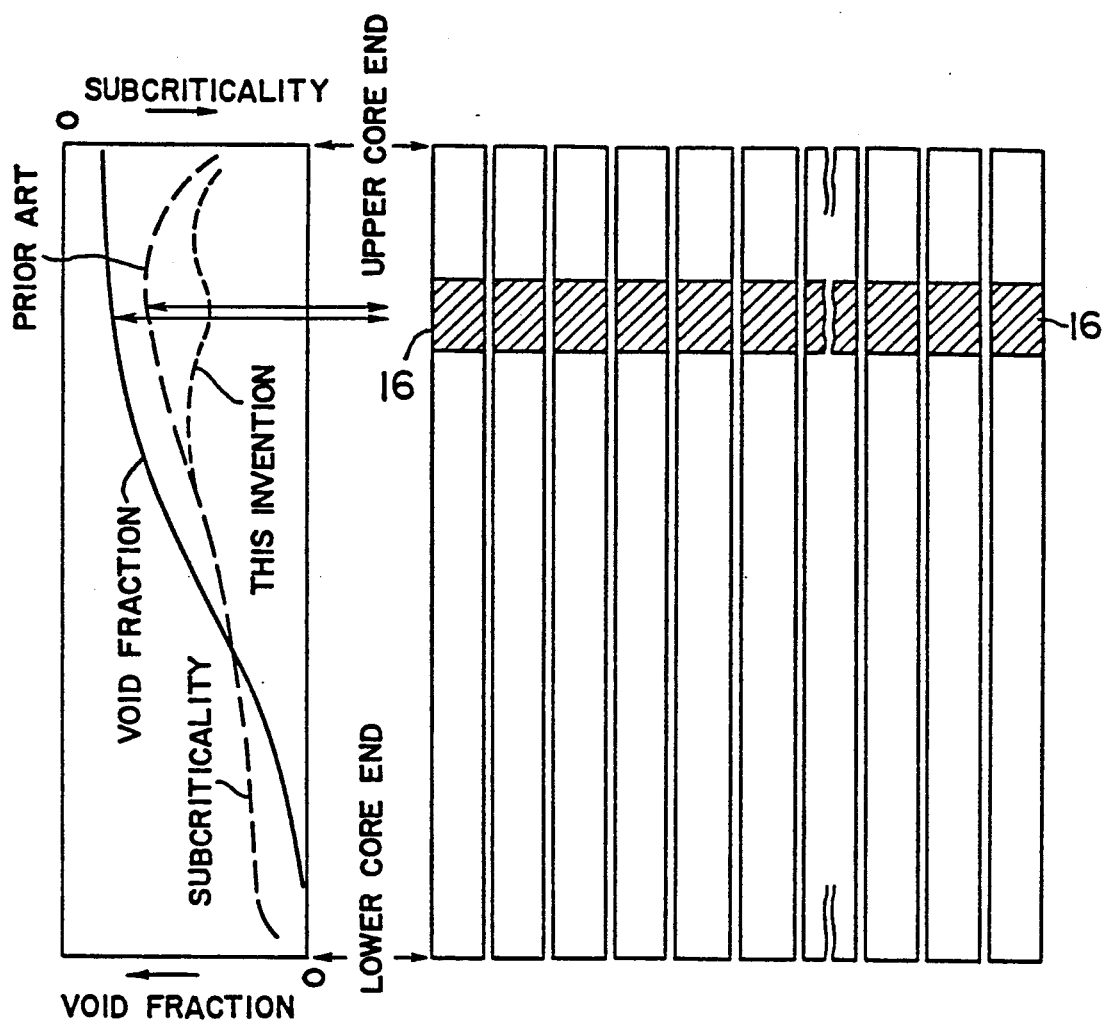
FIG. 10A is a brief elevational section of a reactor core of a BWR which applies the fuel assembly of the third embodiment.
FIG. 10B is a graph showing the relationship between the void fraction in the axial direction of the reactor core of FIG. 10A and the distribution of the subcriticality.

FIG. 10A is an illustration showing the application of the fuel assembly of this invention shown in FIG. 9 to BWR and FIG. 10B is a graph showing the relationship between the void fraction in the axial direction of the reactor core and the subcriticality distribution. The interposed members 16 are arranged in the positions hatched in FIG. 10A, and it is usually effective for their heights to be in accordance with the location levels of the interposed members 16 in the respective fuel rods. Although the axial length of each of the interposed members may be varied in accordance with the numbers of the fuel rods provided with interposed members and the mode of the arrangement, the axial length is usually made to be between 15 to 90 cm. Below 15 cm, much effect cannot be expected, while above 90 cm, the effect is not relatively proportional to the reduction of the amount of the heat generating material to be charged. Since the interposed members are arranged at portions in the fuel assembly at which the subcriticality is smallest, this embodiment of this invention can be effectively operated.

Figure 11:
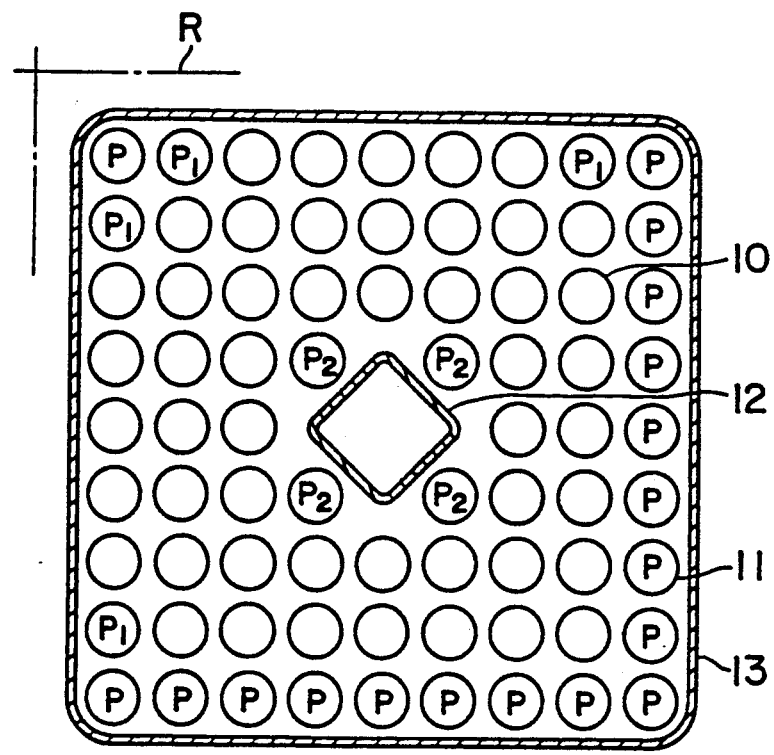
FIGS. 11 to 29 are plan views of the fourth to twenty-second embodiments, respectively, according to this invention.

FIG. 11 is a plan view of the fourth embodiment according to this invention, in which the cruciform control blade R is inserted into or drawn out from the reactor core at a portion facing the upper left corner of the illustrated fuel assembly. Fuel rods P, P1 and P2 provided with the interposed members are suitably selected from those shown in FIGS. 30A to 30D, but the arrangements thereof in the fuel assembly are different from each other, so that different letters are added thereto, (this being also applicable to the embodiments described hereinafter). The like reference numerals are added to portions or elements corresponding to those of the third embodiment, (this matter also being applied to embodiments described hereinafter).

With the embodiment shown in FIG. 11, the peripheral portion of the large square water rod 12 contributes to the improvement of the reactor shut-down margin, and accordingly, four fuel rods P2 provided with the interposed members are substituted for the usual four fuel rods 10 located at the periphery of the water rod 12.

These four fuel rods P2 having the interposed member, effectively serve to increase the multiplication factor Keff during the high temperature (hot) operation period of the reactor core (because the large water rod 12 is provided with a sufficient amount of water and the power is ready to be generated). For this reason, the fuel assembly of this embodiment has the illustrated rod arrangement for effectively utilizing the described phenomenon. The arrangement of the fuel rods P2 effectively enlarges the dimension of the water rod to increase the subcriticality of the reactor core at the cold shut-down period. In order to prevent the lowering of the uranium inventory, designing the fuel rods P1 as usual fuel rods having no interposed members may be considered. For the fuel rods, the described object will be achieved without generating a power spike by inserting, into only the radially central portion, a burnable poison (such as Gd) in an amount so that the poisoning effect vanishes at the end (final stage) of the operation cycle.

Figure 12:
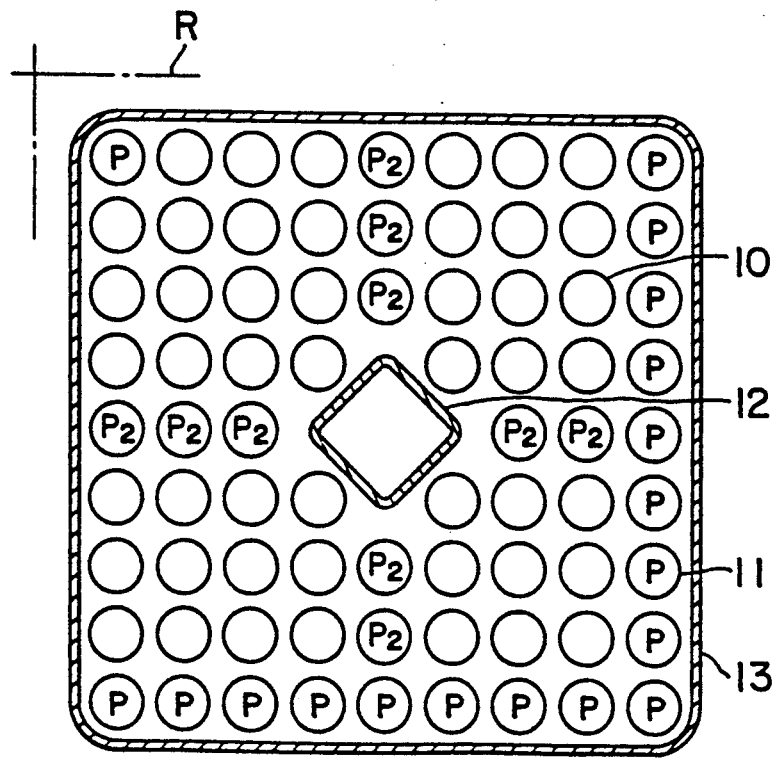

FIG. 12 is a plan view of the fifth embodiment according to this invention in which the fuel rods P2 provided with the interposed members are arranged, in addition to the fuel rods P of the former embodiment, in the cruciform along the extensions of the diagonal lines of the square water rod 12 arranged at the central portion of the fuel assembly. Accordingly, the fuel assembly of this invention includes twenty-eight fuel rods P each provided with an interposed member and forty-eight typical fuel rods 10.

Figure 13:
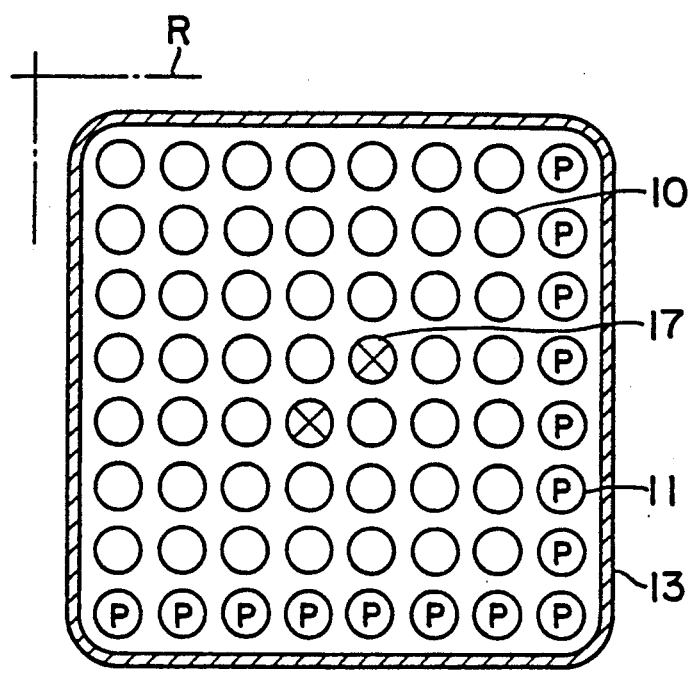

FIG. 13 is a plan view of the sixth embodiment according to this invention which is applied to a conventional fuel assembly in which two fine water rods 17 are disposed in place of the large water rod. Accordingly, the fuel assembly of this embodiment includes fifteen fuel rods P each provided with an interposed member and forty-seven typical fuel rods 10. Provided that the interposed members have an axial length of 30 cm or 45 cm, the uranium inventory is reduced by an amount corresponding to 1.25 or 1.88 fuel rods.

Figure 14:
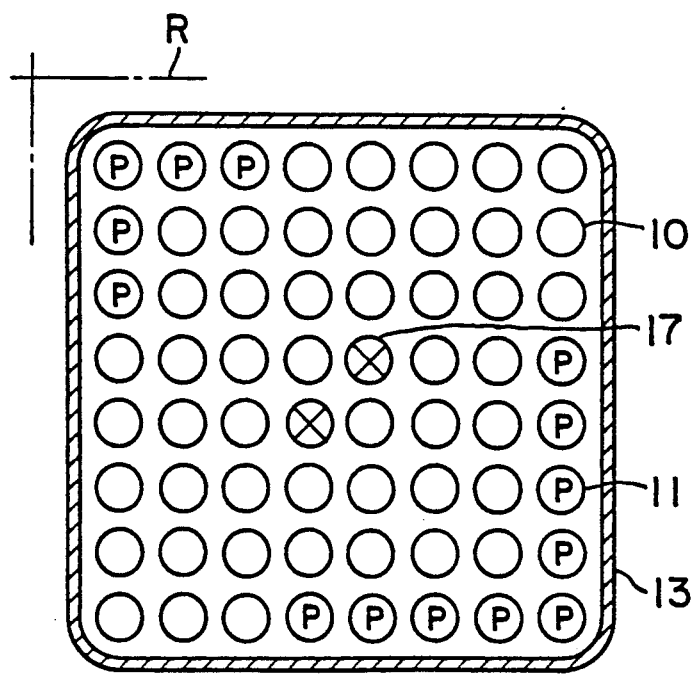

FIG. 14 is a plan view of the seventh embodiment according to this invention which is applied to the conventional fuel assembly of the type described above utilizing two fine water rods 17. The fuel assembly of this embodiment includes fuel rods P each having an interposed member and additionally arranged near the central axis of the control blade, and accordingly, includes fourteen fuel rods P and forty-eight typical fuel rods 10. Provided that the interposed member has an axial length of 30 cm or 45 cm, the uranium inventory is reduced by an amount corresponding to 1.17 or 1.75 fuel rods, but the fuel assembly itself operates with substantially the same function a that of the sixth embodiment shown in FIG. 13.

Figure 15:
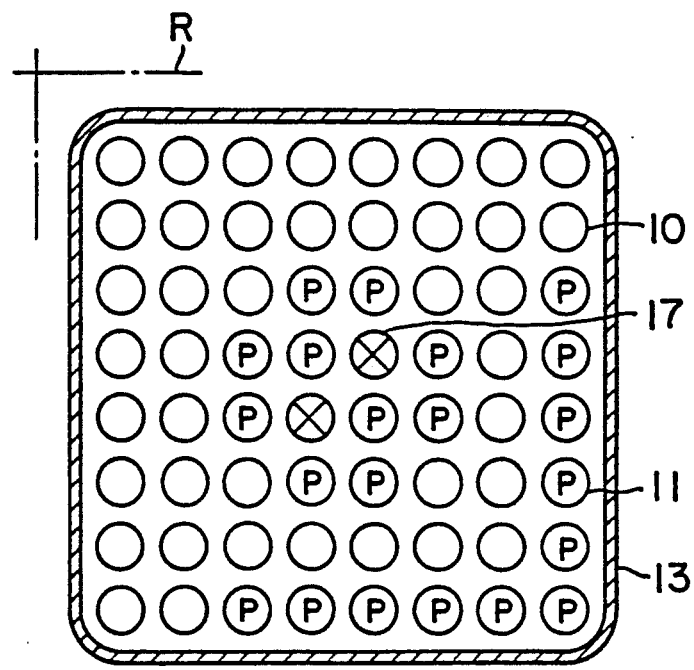

FIG. 15 is a plan view of the eighth embodiment according to this invention which utilizes two fine water rods 17 as described with respect to the embodiments shown in FIGS. 13 and 14. The fuel assembly of this embodiment includes fuel rods P having the interposed members and additionally arranged to concentrate at the central portion of the fuel assembly, and accordingly, includes twenty-one fuel rods P and forty-one typical fuel rods 10. Provided that the interposed member has an axial length of 30 cm, the uranium inventory is reduced by an amount corresponding to 1.75 fuel rods, but in the interior of the fuel bundle, the binding-/separation function occurs due to the variation of water densities at the hot operation period and the cold operation period. The fuel assembly of this embodiment can function more effectively than the former embodiment shown in FIG. 13 or 14.

Figure 16:
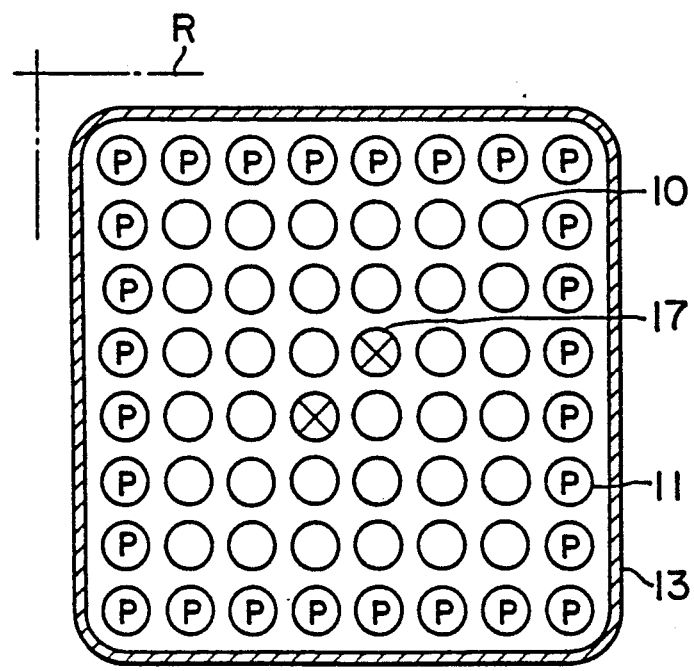

FIG. 16 is a plan view of the ninth embodiment according to this invention also utilizing two fine water rods as in the embodiment shown in FIG. 13 or 14. The fuel assembly of this embodiment includes fuel rods P provided with the interposed members and additionally arranged symmetrically at portions along the entire periphery of the fuel assembly, and accordingly, includes in total twenty-eight fuel rods P provided with interposed members and thirty-four typical fuel rods 10. According to this embodiment, the fuel rods P are located in the increased numbers, so that the uranium inventory is reduced by an amount corresponding to 2.33 fuel rods in the assumption that each of the interposed member has an axial length of 30 cm. It is therefore necessary to slightly reduce the length of the interposed member to eliminate the disadvantage due to the reduction of the $UO_2$ inventory. The fuel assembly of this embodiment has considerably large binding—separation function. Namely, when compared with the other fuel rods P, although the functions of the fuel rods P facing the control blade are lessened during the reactor shut-down period, the characteristics during the high temperature operation period are improved due to the symmetrical arrangement of the additional fuel rods P.

Figure 17:
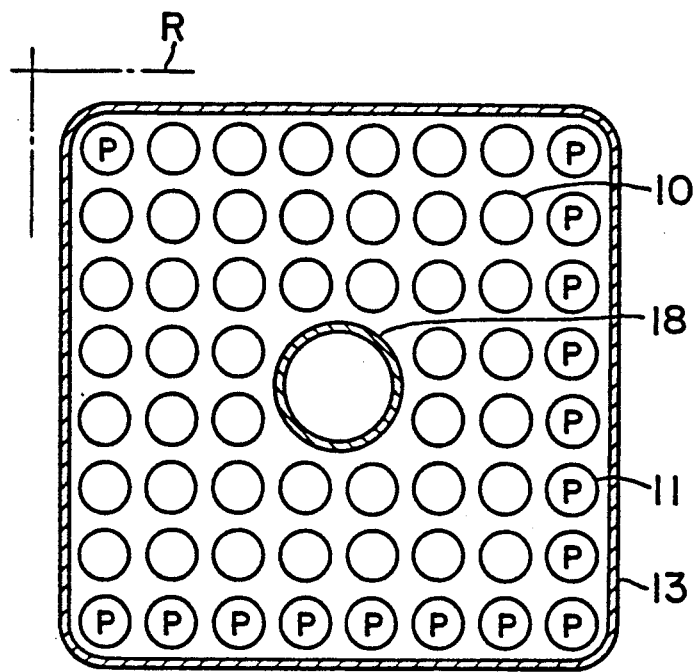

FIG. 17 is a plan view of the tenth embodiment according to this invention, in which a large round water rod 18 having a size corresponding to four typical fuel rods, is disposed at substantially the central portion of the fuel assembly. The fuel assembly of this embodiment further includes sixteen fuel rods P provided with interposed members and forty-four typical fuel rods 10. Provided that each of the interposed member has an axial length of 30 cm, the uranium inventory is reduced by an amount corresponding to 1.33 fuel rods 10. The fuel assembly of this embodiment attains the functions or effects similar to those attained by the embodiments shown in FIGS. 13 and 14.

Figure 18:
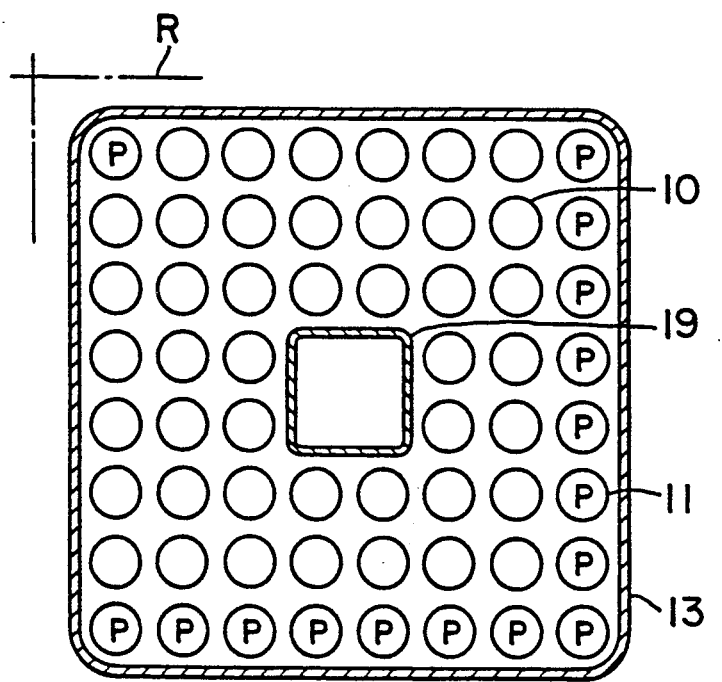

FIG. 18 is a plan view of the eleventh embodiment according to this invention. The fuel assembly of this invention includes a large square water rod 19 having a size corresponding to four typical fuel rods and arranged at the central portion of the fuel assembly, sixteen fuel rods P provided with the interposed members and forty-four fuel rods 10. Provided that each of the interposed members has an axial length of 30 cm, the uranium inventory is reduced by an amount corresponding to 1.33 typical fuel rods. The fuel assembly of this embodiment can attain substantially the same functions and effects as those attained by the embodiment shown in FIG. 17.

Figure 19:
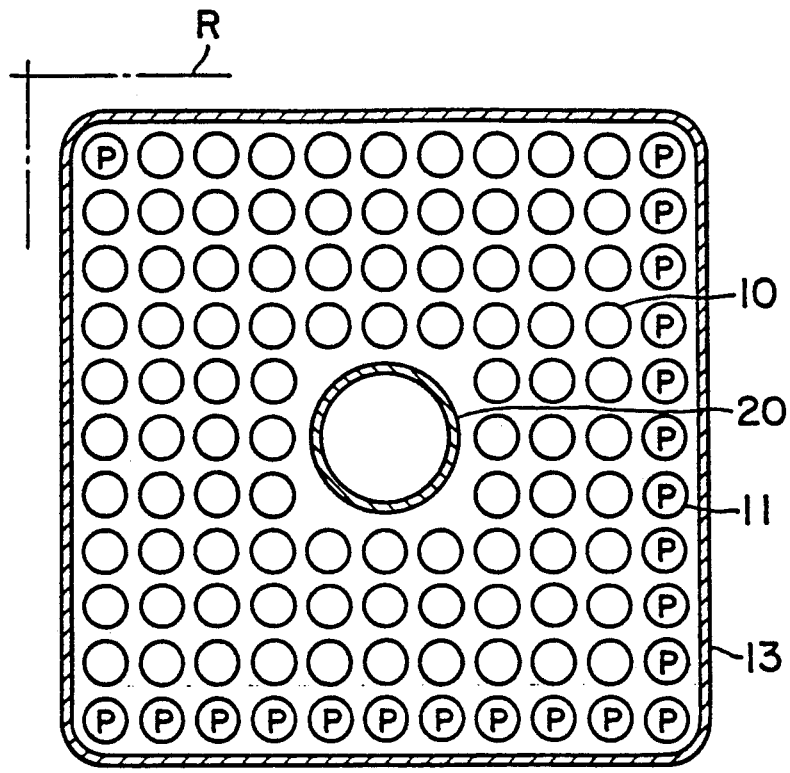

FIG. 19 is a plan view of the twelfth embodiment according to this invention. The fuel assembly comprises 11×11 (eleven lines and eleven rows) fuel cells and includes a large round water rod 20 having a size corresponding to nine typical fuel rods and arranged at the central portion of the fuel assembly. Twenty-one fuel rods P each provided with an interposed member are disposed along the inner wall of the channel box not facing the cruciform control blade, and one fuel rod P is also arranged at the corner portion of the fuel bundle facing the central axis of the control blade. The fuel assembly further includes ninety typical fuel rods 10. Provided that each of the interposed members has an axial length of 30 cm, the uranium inventory is reduced by an amount corresponding to 1.83 fuel rods.

Figure 20:
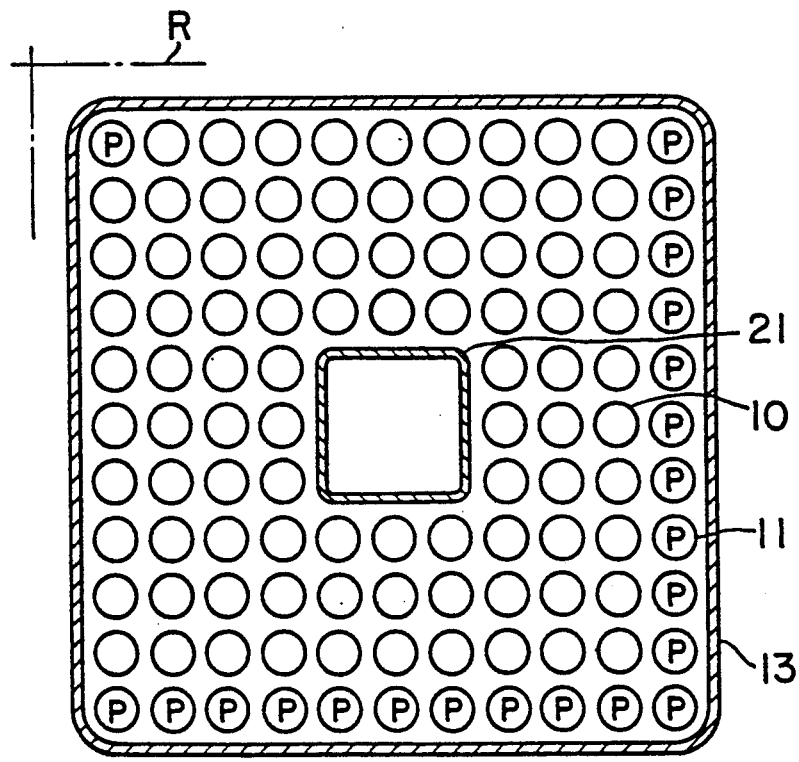

FIG. 20 is a plan view of the thirteenth embodiment according to this invention, which is a modified example of the twelfth embodiment shown in FIG. 19 in which the fuel cells are comprised of 11×11 (eleven lines and eleven rows) fuel rods, and a large square water rod 21 having a size corresponding to nine fuel cells is disposed at the central portion of the fuel assembly. The fuel assembly further includes twenty-two fuel rods P provided with interposed members and ninety fuel rods 10, and attains substantially the same functions and effects as those attained by the former embodiment shown in FIG. 19.

Figure 21:
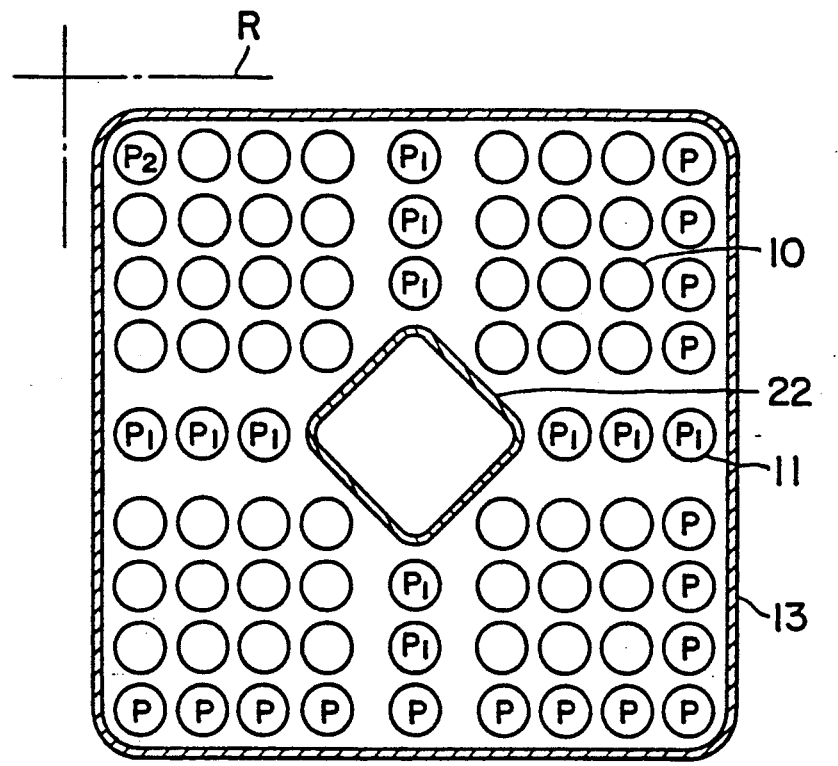

FIG. 21 is a plan view of the fourteenth embodiment according to this invention, in which a large square water rod 22 having a size corresponding to five fuel cells is arranged at the central portion of the fuel assembly at an inclination, in a plan view, of 45° with respect to the fuel bundle. The fuel assembly of this embodiment includes fifteen fuel rods P provided with interposed members, ten fuel rods P1 provided with interposed members and one fuel rod P2 also provided with an interposed member. The fuel rods P1 are arranged in a cruciform shape to divide the fuel bundle into four sections, i.e., four sub-bundles, and the fuel rods P are arranged along the inner walls of the channel box not facing the cruciform control blade. The fuel assembly further includes forty-eight typical fuel rods 10. According to the fuel assembly of this embodiment, in addition to the functions of the fuel rods P, the distance between the sub-regions at the level of the location of the interposed members of the fuel rods P1 centrally arranged in the cruciform shape can be made larger, so that the effective multiplication factor at high temperatures (hot Keff) can be increased and the effective multiplication factor at cold temperature (cold Keff) can be remarkably decreased so that the large reactor shut-down margin can be maintained. Even when the members to be inserted into each of the fuel rods P, P1 and P2 are made relatively short, a remarkable advantageous effect will still be attained. Provided that the interposed member has an axial length of 30 cm, the uranium inventory is reduced by an amount corresponding to 2.33 fuel rods.

Figure 22:
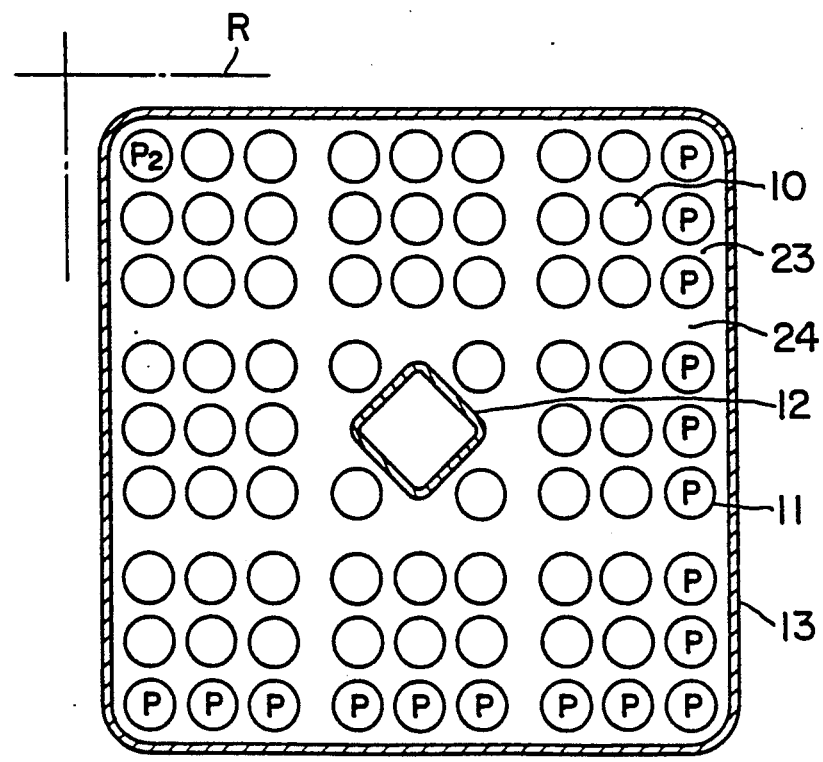

FIG. 22 is a plan view of the fifteenth embodiment according to this invention, in which a square water rod 12 having a size corresponding to five typical fuel rods is disposed at the central portion of the fuel assembly in a manner inclined by 45° with respect to the fuel bundle in a plan view. The entire fuel assembly is divided into nine sub-bundles 23 through slightly wide gaps 24. Fifteen fuel rods P and one fuel rod P both provided with interposed members are arranged along the inner walls of the channel box not facing the control blade and also at a corner portion facing the central axis of the control blade. The fuel assembly of this embodiment further includes sixty typical fuel rods 10. Provided that the interposed members have an axial length of 30 cm, the uranium inventory is reduced by an amount corresponding to 1.33 fuel rods. According to this embodiment, the effects of increasing the effective multiplication factor at high temperatures (hot Keff) and of decreasing the effective multiplication factor at cold temperatures (cold Keff) (maintaining the large shut-down margin) can be attained, but the degree of effect is smaller than those attained by the former embodiment shown in FIG. 21.

Figure 23:
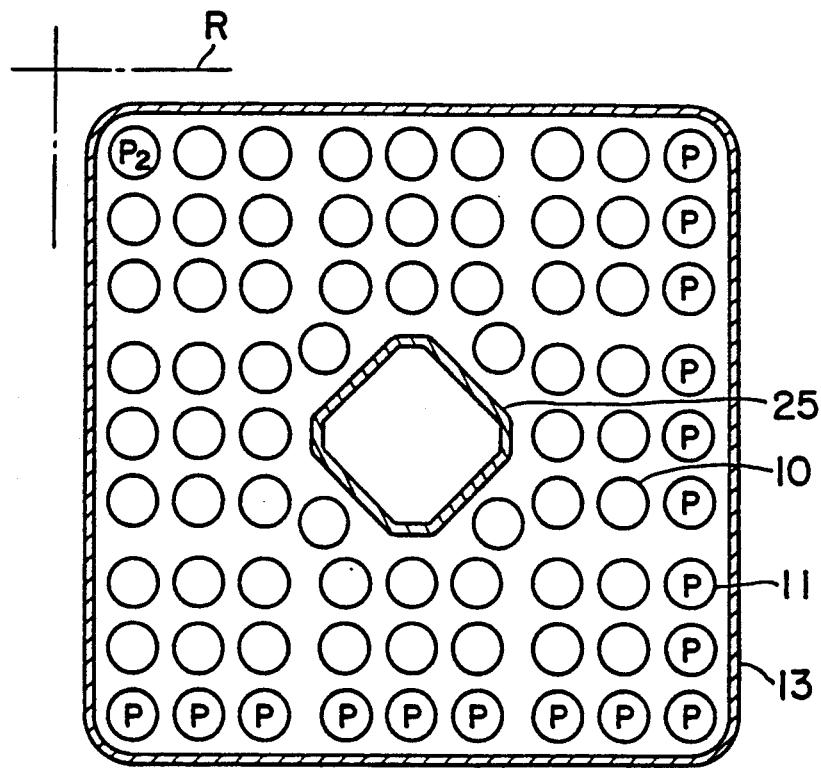

FIG. 23 is a plan view of the sixteenth embodiment according to this invention, which is a modified example of the former embodiment shown in FIG. 22. In the fuel assembly of this embodiment, a square water rod 25 having a size slightly larger than the former one 12 and the respective fuel rod 10 is additionally located at portions facing the sides of the square water rod 25. Accordingly, the fuel assembly of this embodiment includes seventeen fuel rods P provided with interposed members, one fuel rod P2 having an interposed member and fifty-eight typical fuel rods 10. Since the central square water rod 25 has a size larger than that of the former embodiment, the reactor shut-down margin can be sufficiently maintained when comparison with that of the former.

Figure 24:
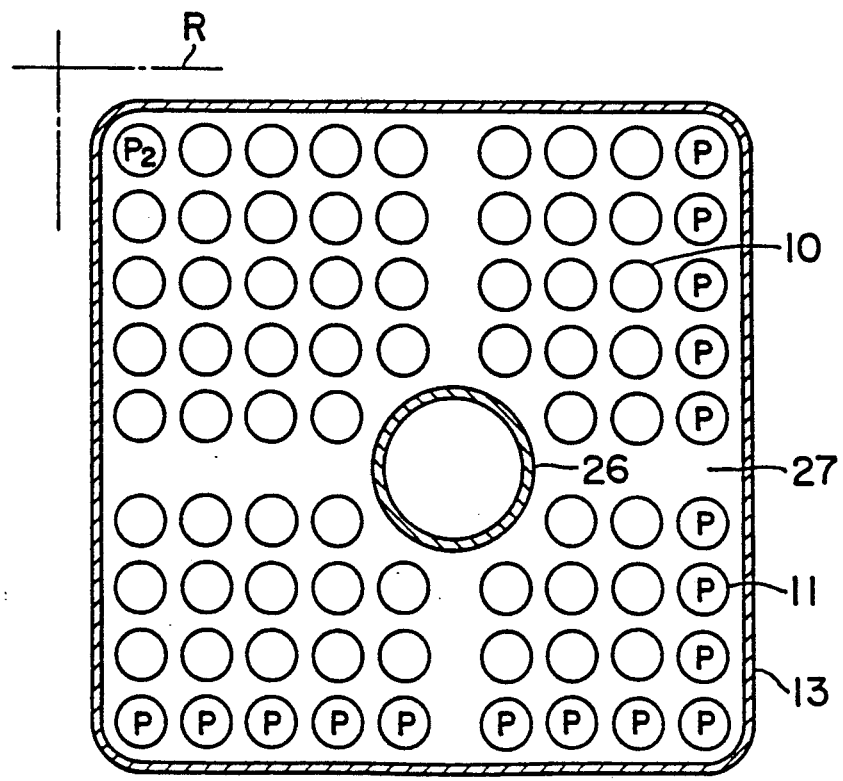

FIG. 24 is a plan view of the seventeenth embodiment according to this invention, which is a modified example of the embodiment shown in FIG. 21 and in which a large round water rod 26 and wide cruciform water gap 27 are arranged in an offset fashion with respect to the fuel bundle. The fuel assembly of this type is effectively applicable to a reactor core of BWR-D lattice type in which the widths of the water gap at the outer periphery of the fuel assembly are different. For reactor cores of this type, it is preferred that the cruciform control blade R is disposed so that the central tie rod is arranged at the lefthand upper portion of the illustration. Namely, a large number of fuel rods are arranged in a region having a wide water gap. The fuel assembly of this embodiment includes seventeen fuel rods P and one fuel rod P2, both provided with interposed members, and fifty-nine typical fuel rods 10.

Figure 25:
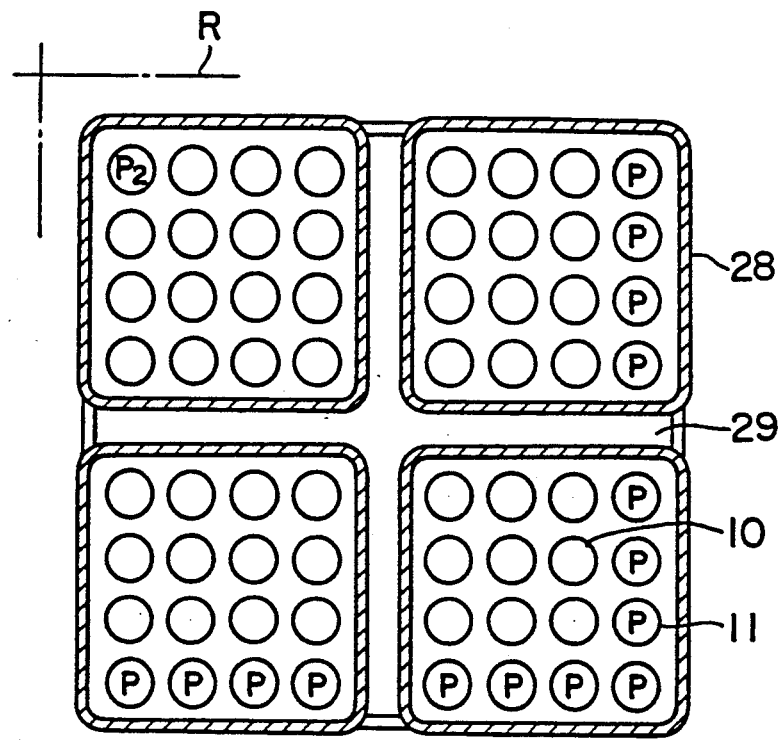

FIG. 25 is a plan view of the eighteenth embodiment according to this invention which comprises four sub-bundles 28 each separated by a cruciform gap 29 as a non-boiling moderator water area. Fifteen fuel rods of the P type are arranged at portions facing the water gap not facing the control blade R, and one fuel rod P2 is arranged at a corner portion facing the central axis of the control blade R. The fuel assembly further includes forty-eight typical fuel rods 10. This embodiment attains the advantageous effects of increasing the effective multiplication factor at high temperatures and of decreasing the effective multiplication factor at cold temperatures, i.e., for maintaining the reactor shut-down margin.

Figure 26:
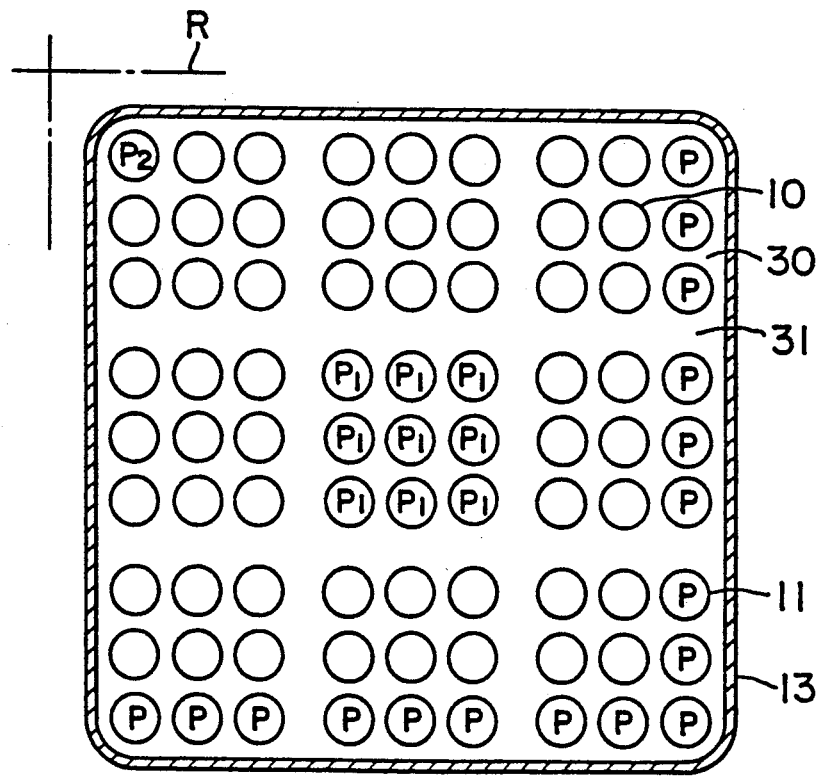

FIG. 26 is a plan view of the nineteenth embodiment according to this invention which comprises nine sub-bundles 30 separated by wide gaps 31 and each consisting of nine fuel rods 10. Seventeen fuel rods of the P type are arranged so as to face the water gap not facing the control blade R and one fuel rod P2 provided with the interposed member, is arranged at a corner portion facing the central axis of the control blade R. The central sub-bundle includes fuel rods of the P1 type, and accordingly, the fuel assembly of this embodiment includes seventeen fuel rods P, nine fuel rods P1, one fuel rod P2 and fifty-four typical fuel rods 10. The fuel assembly of this embodiment can attain the advantageous effects of increasing the effective multiplication factor at high temperatures and of decreasing the effective multiplication factor at cold temperatures, i.e., maintaining a high reactor shut-down margin.

Figure 27:
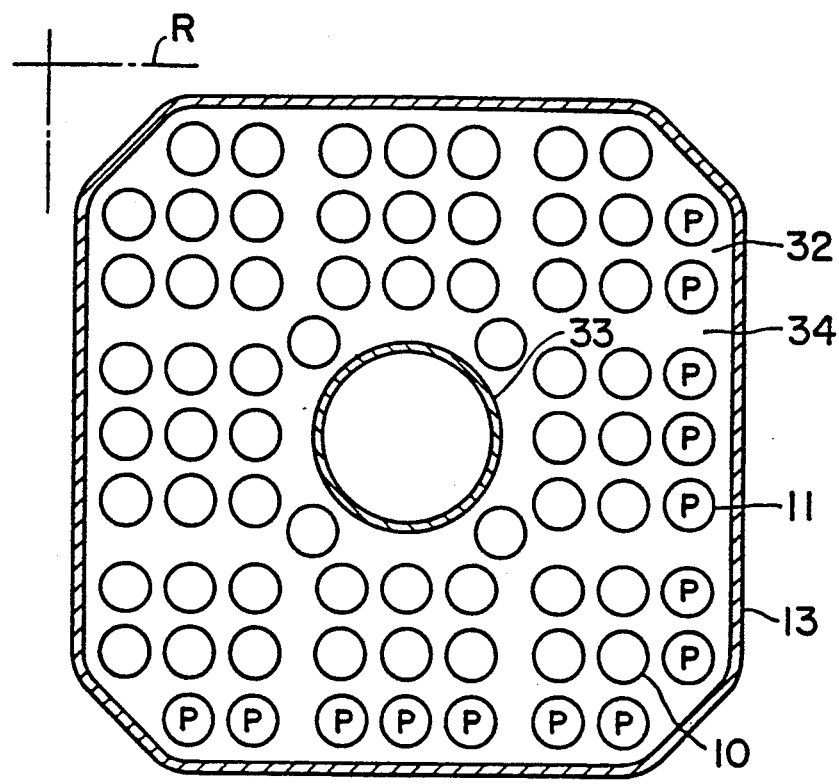

FIG. 27 is a plan view of the twentieth embodiment according to this invention, which comprises nine sub-bundles with a large water rod 33 having a size corresponding to five typical fuel rods and arranged at a central portion of the fuel assembly. The fuel rods to be disposed at the respective corner portions of the fuel bundle are removed and the corner surfaces of the channel box are chanfered. The fuel rods 10 are additionally disposed in the gaps 34 between the outer periphery of the round water rod 33 and the sub-bundles 32. According to the arrangement of this embodiment, the stresses occurring in the channel box can be effectively reduced so that the thickness of the channel box can be reduced. Accordingly, the effective multiplication factor during the high temperature operation period can be improved and the water is in the condition of excess during the cold operation period, so that the reactor shut-down margin can be improved. The fuel assembly of this embodiment includes fourteen fuel rods P provided with interposed members, and provided that each interposed member has an axial length of 30 cm, the uranium inventory is reduced by an amount corresponding to 1.17 fuel rods, and that each interposed member has an axial length of 45 cm, the uranium inventory is reduced by an amount corresponding to 1.75 fuel rods. For example, in the latter case, an inventory reduction corresponds to 6.75 fuel rods because of the location of the water rod having a size corresponding to five fuel rods. However, with the 9×9 type fuel assembly, since a water rod having a size corresponding to nine fuel rods is arranged, there is a gain of the inventory corresponding to 2.25 fuel rods.

Figure 28:
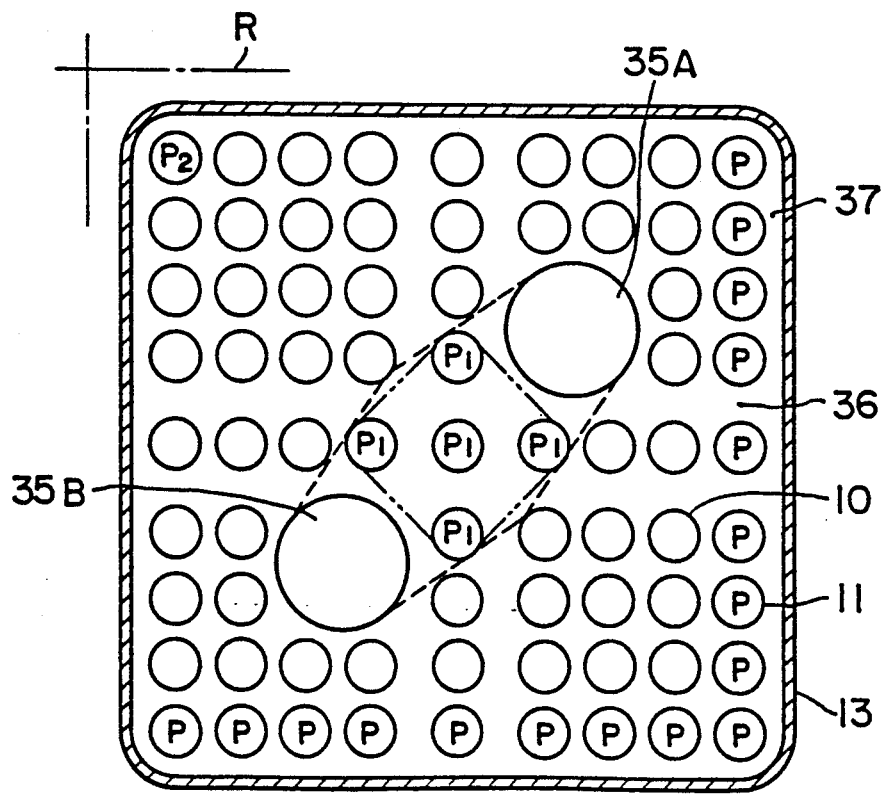

FIG. 28 is a plan view of the twenty-first embodiment according to this invention. The fuel assembly of this embodiment includes fuel rods 10 in the arrangement basically identical to that shown in FIG. 21, but in this embodiment, two large round water rods 35A and 35B are arranged as shown, between which five fuel rods P1 provided with interposed members are located. Accordingly, the fuel assembly of this invention includes seventeen fuel rods P1 and one fuel rod P2 both provided with interposed members. Gaps 36 are disposed between the respective sub-bundles 37 as shown in FIGS. 22 to 23. A wide area having no fuel is formed by the water rods 35A and 35B and the fuel rods P1 at the level where the interposed members are located, so that a large reactor shut down margin can be attained.

Figure 29:
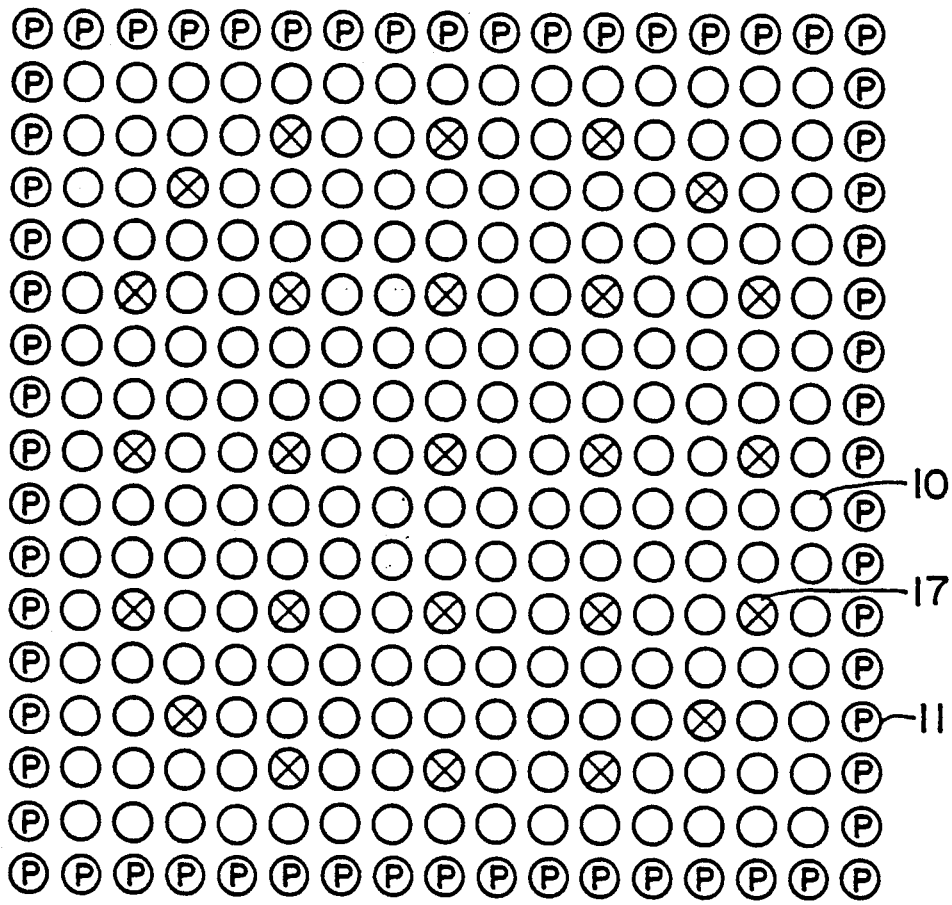

FIG. 29 is a plan view of the twenty-second embodiment according to this invention, which is applicable to a reactor core of a PWR (pressurized water reactor). The fuel assembly includes fuel rods in a 17×17 (seventeen rows and seventeen lines) arrangement, i.e., two hundreds and sixty-four fuel rods 10 and 11, twenty-five water rods 17 and sixty-four fuel rods 11 arranged on the outer periphery thereof as fuel rods of the P type and provided with the interposed members. Since no water gap is located between the respective fuel assemblies of the PWR, two rows of the fuel rods of P type lined side by side in the respective fuel assemblies form no fuel areas at the portions into which the interposed members are inserted. During the reactor shut-down period, the water at these portions acts to separate the respective fuel rods, and during the high temperature operation period, the binding effect is improved by the lowering of the water density (65 to 70% in the cold operation shut-down period). With PWR, no voids are generated, so that in a case where the no fuel area is wide, the binding effect becomes disadvantageously insufficient even during the high temperature operation period. The extent of this, however, is suitable for this embodiment. The rows of the fuel rods P may be arranged in the interior of the fuel assembly. The axial level of the interposed area of the interposed members is different from that in the case of BWR, but it may also be effective to locate the interposed area at the axially central portion of the fuel rods or the slightly upper portion from the central portion in consideration of the influence of the power suppression at the upper portion due to the insertion of the control rod. Provided that each of sixty-four fuel rods P has an interposed member having an axial length of 30 cm, the $UO_2$ inventory is reduced by an amount corresponding to 5.33 fuel rods. This corresponds to a 2% reduction of the fuel rods in the fuel assembly of 264 fuel rods, but the reduction can be recovered by increasing the relatively enrichment of the fuel rods by 2%, for example, 3.5 wt% to 3.57 wt%.

FIGS. 30A to 30D show elevational sections of fuel rods of the P type provided with interposed members.

Figures 30A, 30B, 30C, 30D:
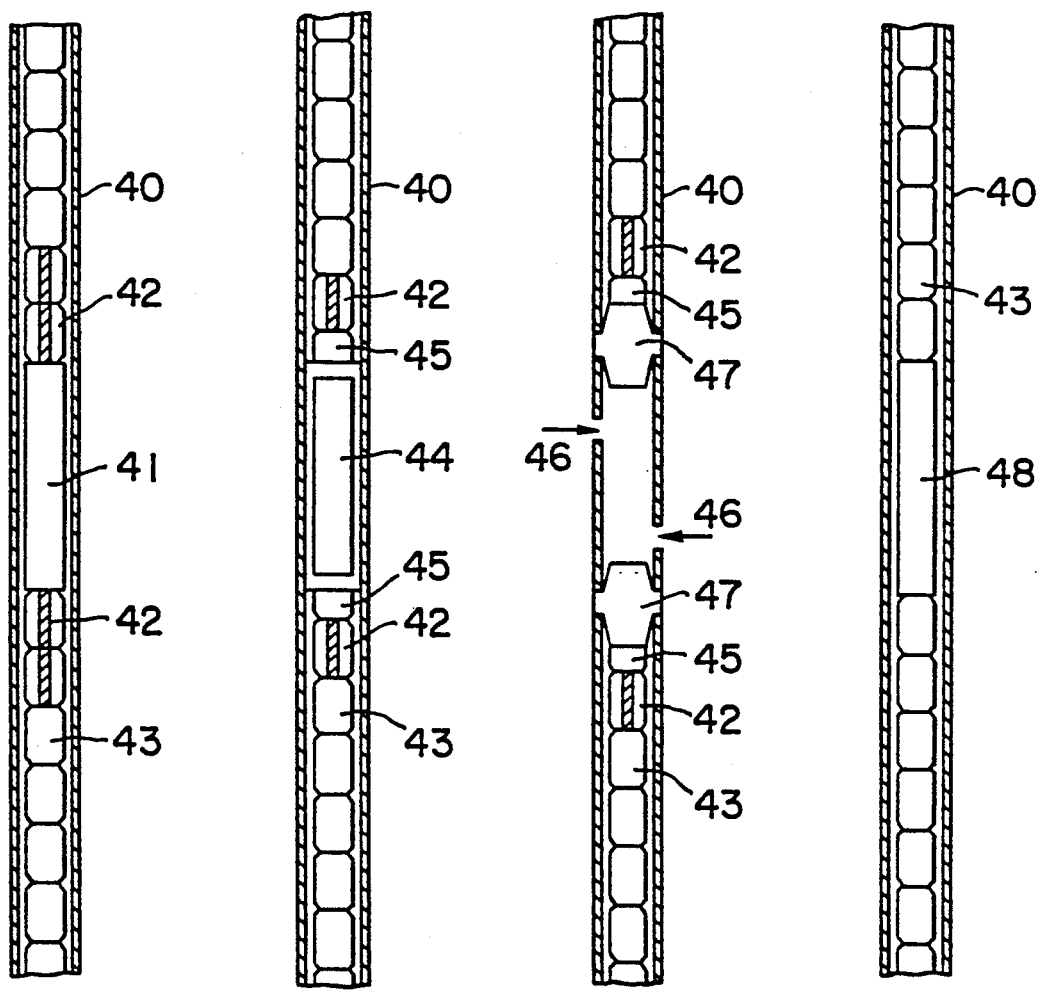
FIGS. 30A to 30D are elevational sections of fuel rods of different types according to this invention.

The fuel rods of FIG. 30A include a zone of a cladding tube 40 in which no fuel material is contained, and the no-fuel area has an axial length of 15 to 90 cm, into which graphite 41 is packed. The graphite 41 has a superior high temperature characteristic and absorbs fewer thermal neutrons, thereby making it suitable for use as a moderator. $Al_2O_3$ or $ZrO_2$ of low density (i.e., porous material) has a poor moderation power, but an excellent heat-resistant characteristic so that such materials having a lower neutron absorbing ability may be utilized. Hollow graphite, hollow $Al_2O_3$, hollow $ZrO_2$, hollow natural uranium, and hollow depleted uranium may also be utilized instead of solid graphite, and if such hollow material is utilized, the hollow portion is then utilized as a gas plenum. In the case where solid natural uranium or depleted uranium is utilized, the characteristic features of this invention may be liably slightly reduced as a consequence.

The most important point in the characteristic features required for this area resides in that the thermal neutron absorption ratio, at the end (final stage) of the reactor operation cycle, is smaller than those of the fuel areas positioned on both axial sides of this fuel area. With the fuel materials adjacent to the charged graphite 41, power peaks (spikes) are generated in a range of about 2 cm (at the uppermost, 5 cm), which is not advantageous for the soundness of the fuel. Accordingly, two fuel pellets 42 each having a length of about 2 cm and containing burnable poisons are located only at the portions near the axis thereof. These pellets 42 do not contain burnable poisons at their outer peripheral portions and a power output with relatively small variation can be obtained throughout the whole reactor operation cycle. It is desirable to design the fuel rods so that absorbing property of this poison disappears when the reactor operation cycle approaches the final stage and the output power of this area gently increases.

The neutron interaction (binding effect) in the horizontal fuel area arranged adjacent to an interposed area is reduced, and as a result, the subcriticality of the reactor during the shut-down period can be made still larger.

The difference between the fuel rods shown in FIG. 30A and those shown in FIG. 30B resides in that a tube 44 made of zircaloy having a small neutron cross section is charged in the fuel rod shown in FIG. 30B instead of the graphite 41, and in this example, many modifications will be considered, for example:

(1) When it is used as a gas plenum, the tube is made as an unsealed tube. In this structure, the gas plenum in the upper location of the fuel can be eliminated or made shorter, so that the diameter thereof can be made smaller to enlarge the coolant flow area and consequently achieve reduction of the pressure drop.

(2) In the case where $ZrH_2$ (zirconium hydride) is fitted at high concentration, it is desired to seal the $ZrH_2$—precisely $ZrH_2$ should be denoted by $ZrH_x$ ($0 < x < 2$)—in the tube, and it is desirable for the number x to have a large value for the purpose of this invention, because the $ZrH_x$ becomes brittle when the value of x becomes large. A relatively small gap is provided in the tube for utilizing the gap as the gas plenum for $H_2$ gas discharged in slight amounts from the $ZrH_2$.

(3) Be and BeO which are poisonous are preferably charged in the tube, and since He gas is generated in the reaction between the Be and neutrons, a small plenum for He gas will be disposed in the tube.

Between the zircaloy tube 44 and the fuel pellet 43 are inserted or charged thermal insulation pellets 45, $Al_2O_3$, $ZrO_2$, $Yb_2O_3$—$HfO_2$, depleted uranium or the like for improving the soundness of the fuel. It is preferred that the thermal insulation pellets 45 have a small thermal neutron absorption characteristic at the end (final stage) of the reactor operation cycle, and accordingly, burnable poison bearing $Al_2O_3$—$Gd_2O_3$ pellet or depleted uranium $UO_2$—$Gd_2O_3$ pellet is utilized in a preferred example. With the axially adjacent fuel pellets of the zircaloy tube 44, it is desired to arrange the pellets 42 in which the burnable poison is contained, so as to have a length of about 2 cm (at the uppermost, 5 cm) from the end portion thereof.

Although in the embodiment of FIG. 30B, the pellets 42 in which Gd pellets having a fine diameter are inserted, are illustrated, the Gd may be entirely blended into the pellets 42. This matter is applicable to the fuel rods shown in FIGS. 30A and 30C.

The difference between the fuel rods shown in FIG. 30B and those shown in FIG. 30C is that water is introduced in the fuel rods shown in FIG. 30C. Namely, with the fuel rod of FIG. 30C, water holes 46 are formed in the upper and lower portions of the cladding tube 40 at the portion where the zircaloy tube is located, and an intermediate plug 47 and thermal insulation pellet 45 are disposed at the upper portions and the lower portions of the respective water holes 46. The fuel pellets 42 in which the burnable poisons are contained, are disposed at the upper and lower portions of the intermediate plug 47 and the thermal insulation pellet 45, and the fuel pellets 43 are disposed at the further upper and lower portions of the fuel pellets 42 in the cladding tube as shown in FIG. 30C.

The difference between the fuel rods shown in FIG. 30D and those shown in FIG. 30A resides in that the fuel rods shown in FIG. 30D are provided with an interposed layer 78 in which a burnable poison is added to the graphite (or $Al_2O_3$, $ZrO_2$, $Al_2O_3$—$ZrO_2$). According to this embodiment, the burnable poison is not charged into the fuel, and the fuel rods are easily manufactured.

Figure 31:
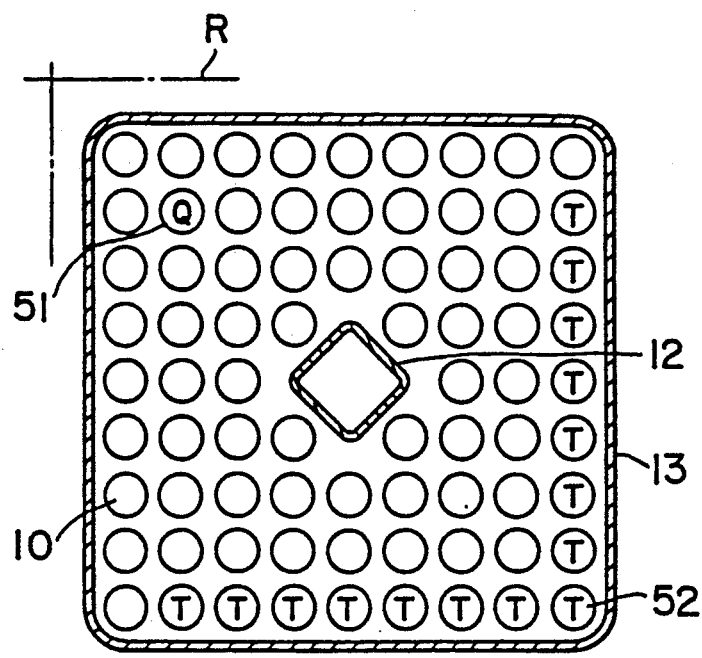
FIG. 31 is a plan view of the twenty-third embodiment according to this invention.
Figure 32:
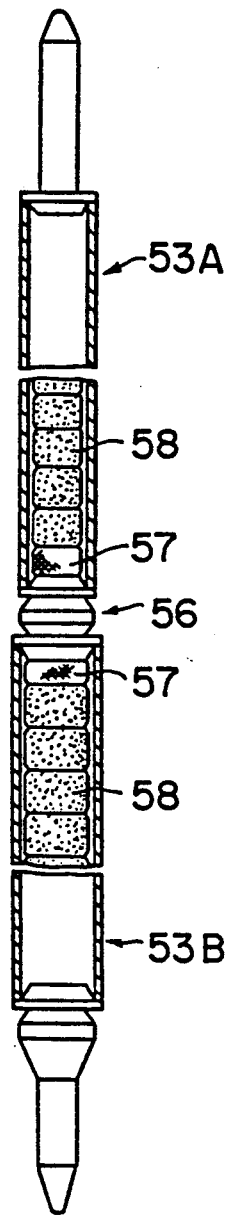
FIGS. 32 and 33 are partial elevational sections of the fuel rods according to this invention, respectively.
Figure 33:
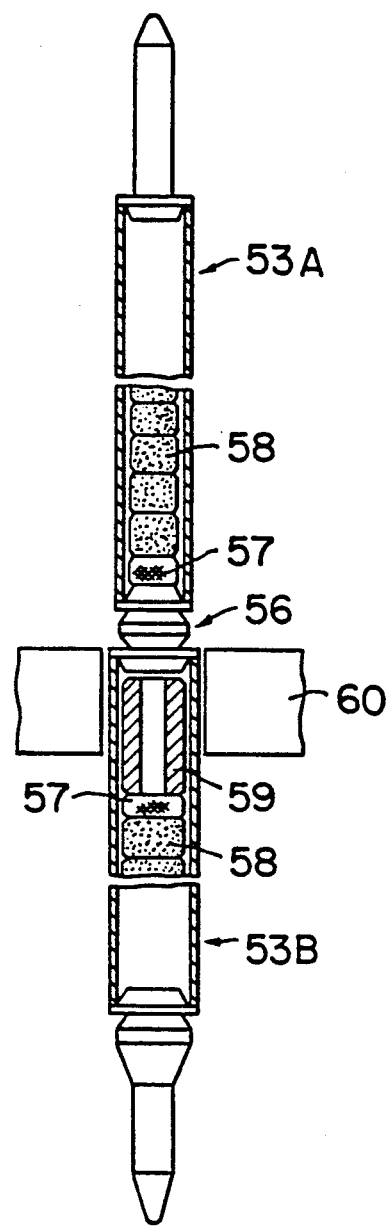

FIG. 31 is a plan view of the twenty-third embodiment according to this invention. In this embodiment, partial length fuel rods 51 each provided with a removed upper portion and hence having an axially short length (hereinafter referred to as "Q-type fuel rods") and fuel rods 52 of the T-type such as shown in FIGS. 32 and 33 are disposed in the channel box 13 in addition to the usual standard fuel rods 10. The fuel rods of the T-type comprise, as shown in FIG. 32, an upper half 53A, a lower half 53B having a diameter larger than that of the upper half 53A, and a connecting member 56 connecting the upper and lower half fuel rods. Thermal insulation pellets 57 (acting for suppressing the power spikes) are disposed at the lower end portions of the fuel pellets 58 of the upper half fuel rods 53A and at the upper end portions of the fuel pellets 58 of the lower half fuel rod 53B, respectively. The fuel rods of the T-type shown in FIG. 33 are provided with a graphite containing area 59 at the upper portions of the thermal insulation pellets 57 disposed at the upper end of the lower half 53B of the fuel rods. The connecting members 56 are disposed near spacers 60. The location of the thermal insulation pellets 57 and the hollow graphite areas 59 in the fuel areas with the connecting member 56 interposed aims to prevent the occurrence of power peaks (spikes), and for this purpose, the graphite containing area 59 which has high temperature characteristics, less thermal neutron absorption and high moderating properties is arranged near the central connecting region, or alternatively, the thermal insulation pellet 57 (acting for suppressing the power spike) formed by a material having a good heat-resistant property such as $Al_2O_3$, $Yb_2O_3$—$HfO_2$, or $Al_2O_3$—$Gd_2O_3$ is arranged near the central connecting region.

The fuel rod 52 of T-type is disposed on the side of the water gap into which the control blade R is not inserted, whereas the fuel rods 51 of the Q-type are disposed near the corner portion facing the control blade R.

Figure 34:
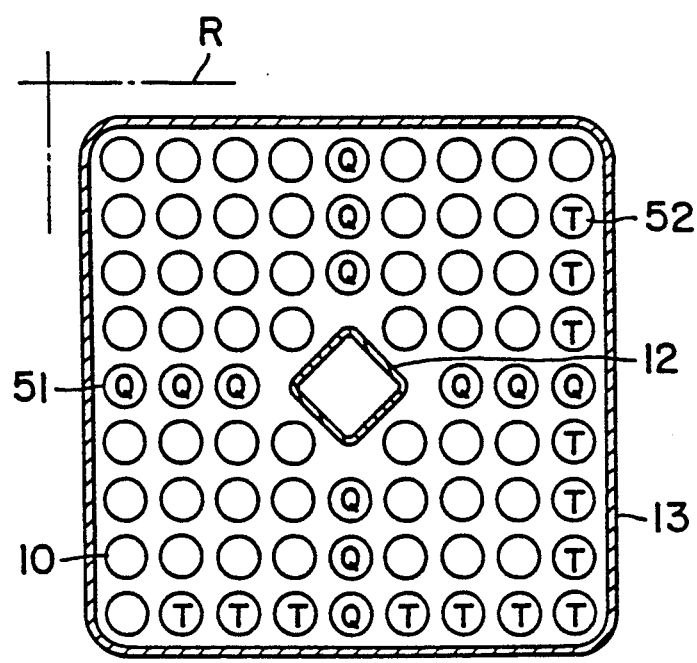
FIGS. 34 to 38 are plan views of the twenty-fourth to twenty eighth embodiments according to this embodiment.

FIG. 34 is a plan view of the twenty-fourth embodiment according to this invention, in which the fuel rods 51 of the Q-type are arranged in a cruciform shape with a water rod 12 located centrally.

Figure 35:
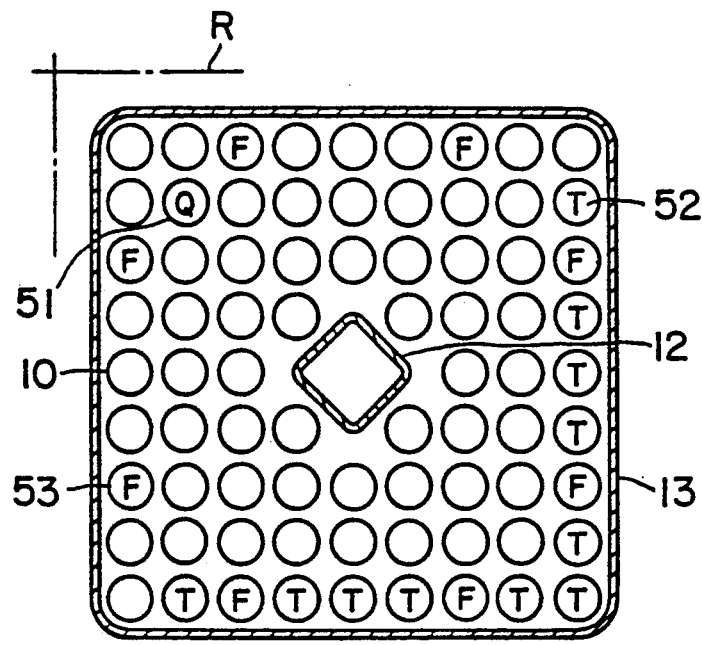
Figure 36:
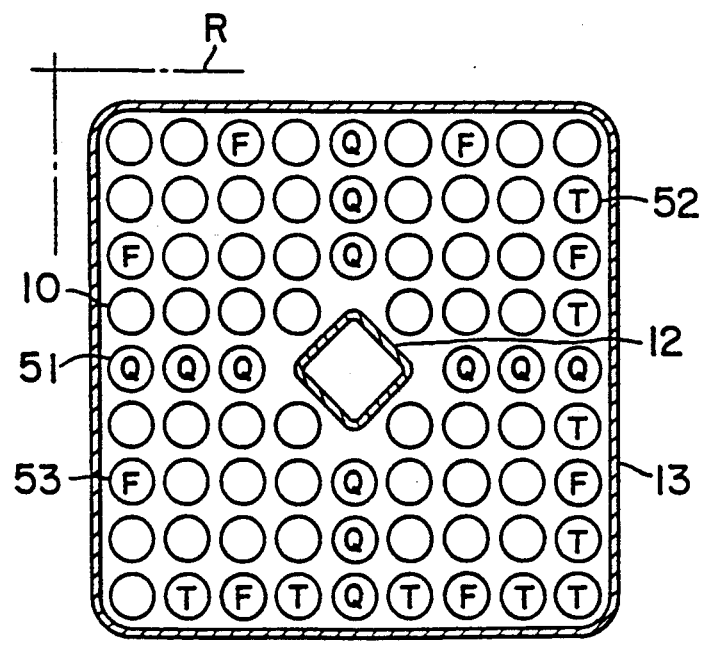

FIGS. 35 and 36 are plan views of the twenty-fifth and twenty sixth embodiments according to this invention, and in these embodiments, fuel rods 53 of the F-type for the tie rod are arranged in addition to the fuel rods 52 (T type) and 51 (Q-type), and the fuel rods 53 (F-type) are also partially arranged on the side of the water gap into which the control blade R is inserted instead of the fuel rods 52 (T type).

Figure 37:
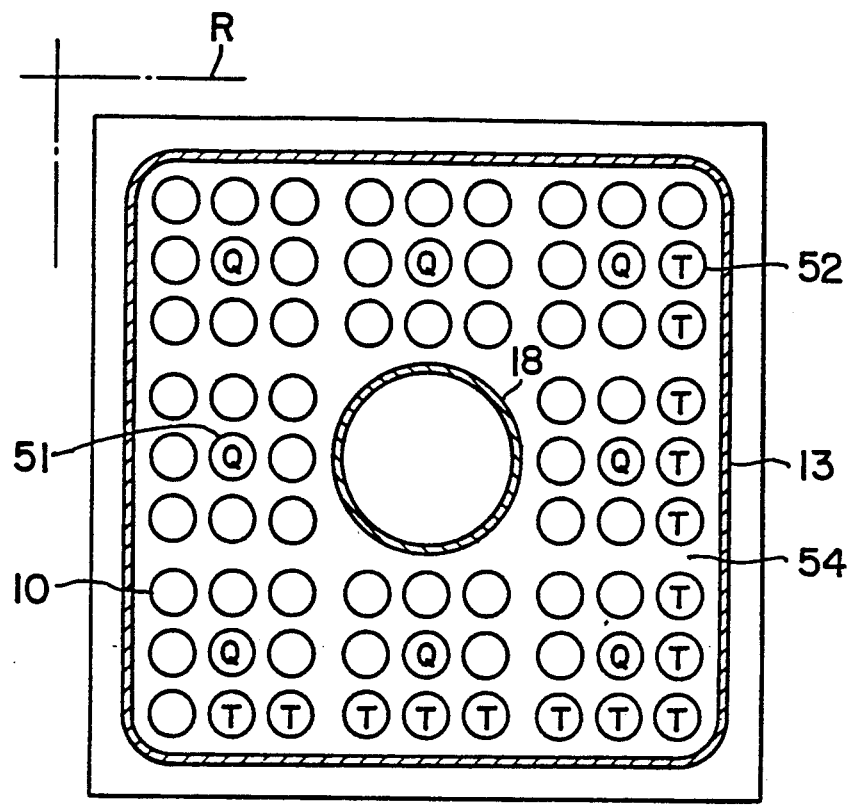
Figure 38:
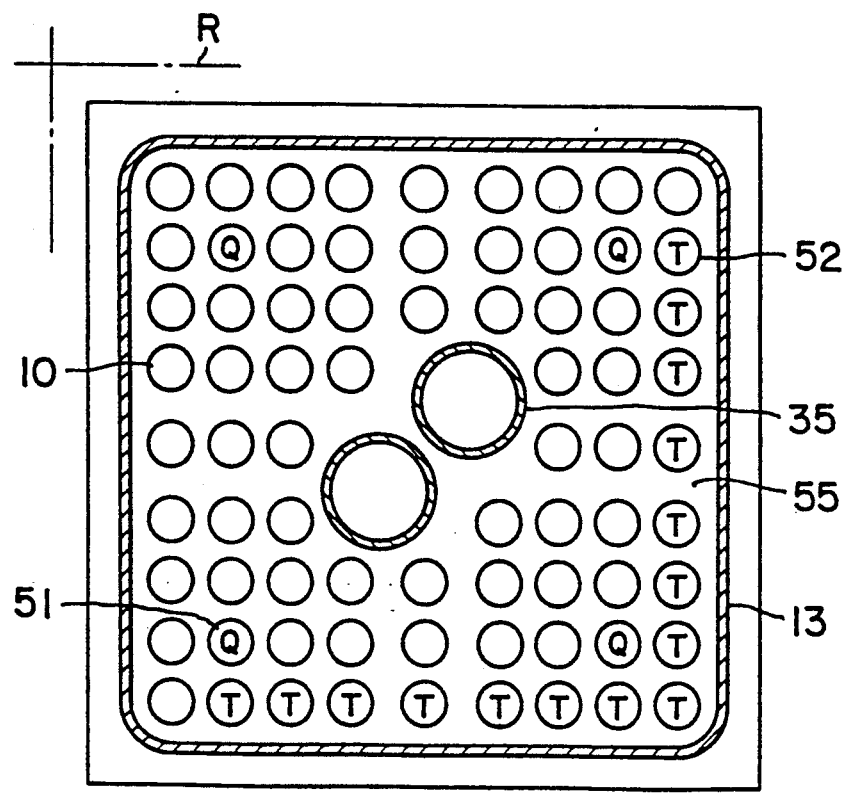

FIGS. 37 and 38 are plan views of the twenty-seventh and twenty-eighth embodiments according to this invention, in which water gaps 54 and 55 are disposed between the respective sub-bundles, and the distance between the fuel rods facing the water gap 54 or 55 is made slightly larger than that of the other fuel rods. According to this arrangement, unique characteristics occur for the resonance escape probability and for the thermal utilization factor depending on the water density, and the infinite multiplication factor of the fuel assembly can be made small during the reactor shut-down period and made larger during the reactor operation period.

Figure 39A:
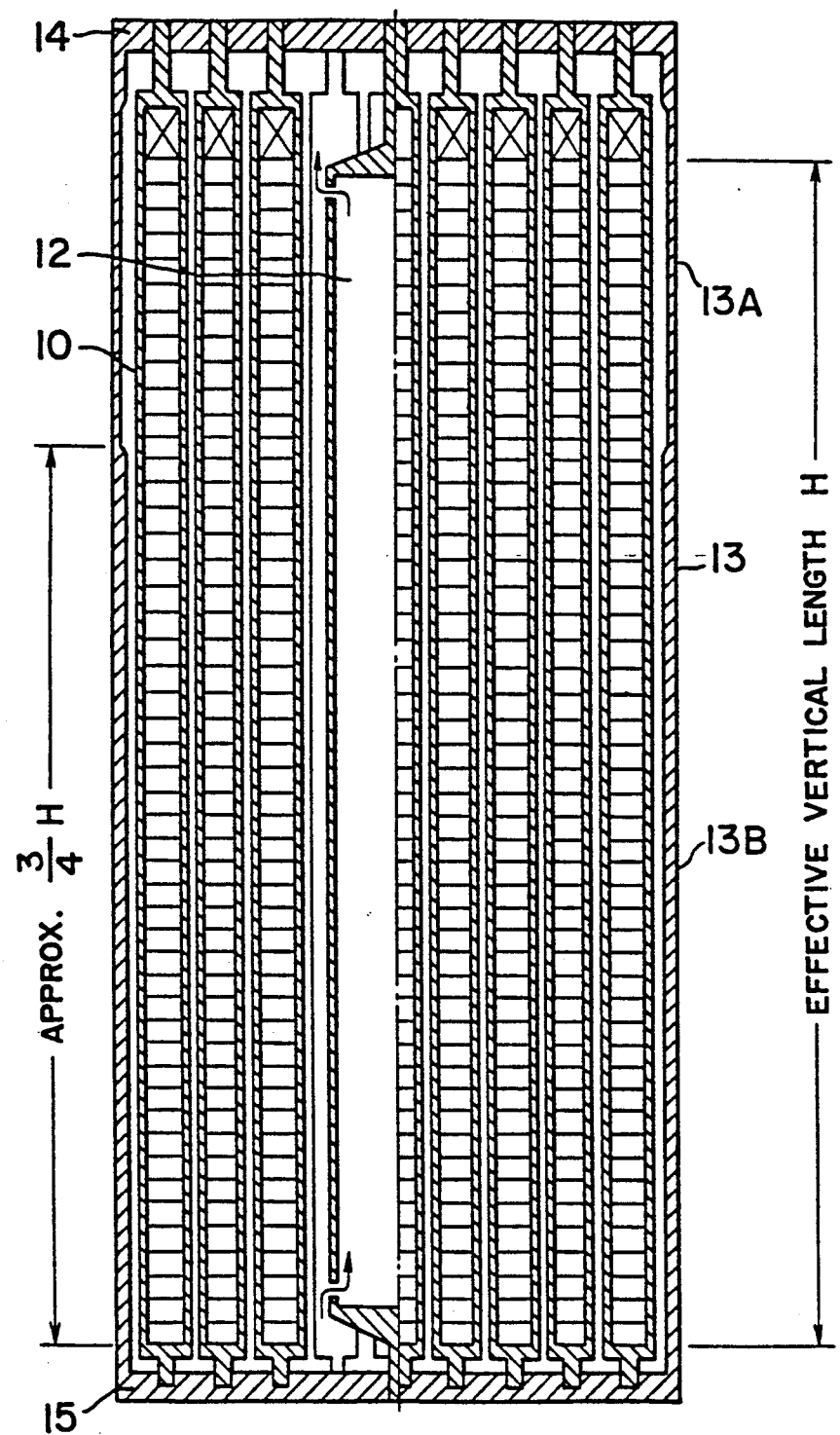
FIGS. 39A and 39B are an elevational sectional view and a plan view of a fuel assembly having a channel box having a reduced thickness at its upper portion for increasing water in the fuel assembly.
Figure 39B:
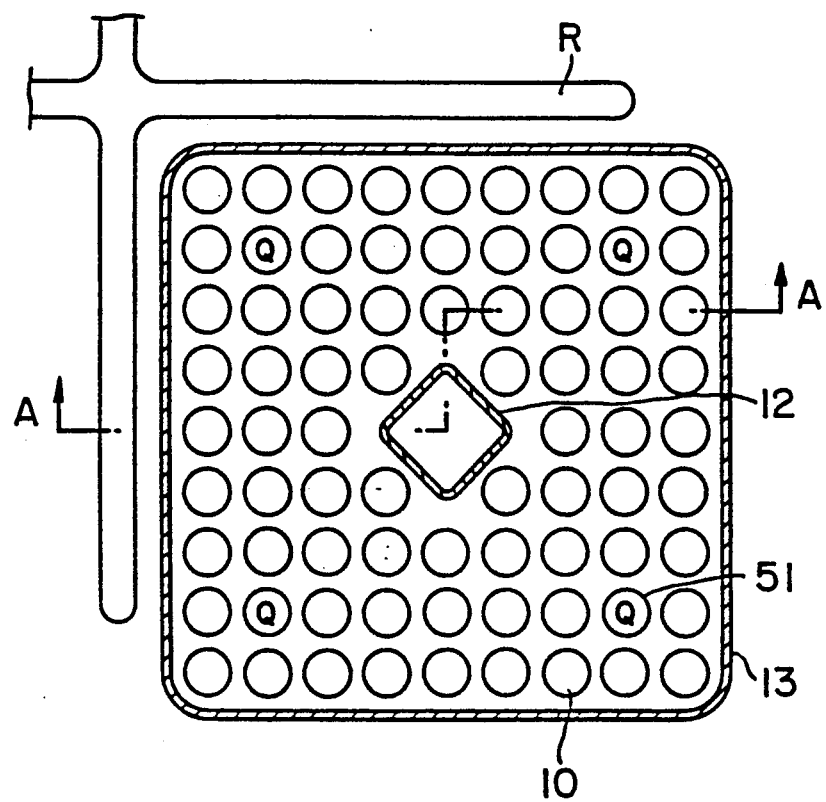

FIGS. 39A and 39B represent an example of a fuel assembly for improving the reactor shut-down margin by increasing the amount of water inside the channel box 13. The fuel assembly of this example includes a square water rod 12 centrally arranged, and fuel rods 10 and partial-length fuel rods 51 (Q-type) arranged in a regular fashion except for the central portion of the fuel assembly. The fuel assembly is secured by an upper tie plate 14, spacers (not shown) and a lower tie plate 15 and surrounded by a channel box 13. The channel box 13 comprises an upper portion 13A having a thin wall and a lower portions 13B having a thick wall, and the boundary of these portions 13A and 13B exists near a portion apart from the lower end of the fuel assembly by about ⅓ of the length thereof. The upper portion 13A is designed so as to have four thin walls or to have two thin walls facing the water gap into which no control blade is inserted. Moreover, the wall thickness of the upper portion 13A of the channel box 13 may be made thinner by cutting the outer surfaces thereof as well as the inner surfaces.

As described hereinbefore, according to the fuel assemblies of this invention, the atomic number densities of the fissionable material in the fuel rods mainly facing the water gap into which the control blade is not inserted, are made smaller than those of the fuel rods arranged in the other areas, so that the relative output of the fuel rods facing the control blade is made larger, the worth of the control blade is improved, and hence, the average relative power of the fuel rods adjacent to the water gaps is made smaller. Accordingly, the reactor shut-down margin can be improved by reducing the difference in the reactivity between the power operation period and the cold operation period.

Moreover, according to the fuel assemblies of this invention, the neutron interaction (binding effect) of the fuel areas horizontally adjacent to the areas (i.e., interposed areas) of the low density of the fissionable material during the reactor shut-down period, and as a result, the subcriticality of the reactor during the shut down period can be made larger. The arrangement of the fuel rods provided with the interposed members on the side of a water gap into which the control blade is not inserted, substantially results in the enlargement of the water gap between adjacent fuel assemblies. Moreover, the multiplication factor is lowered during the reactor shut-down period (that is; the subcriticality is made larger), and during the high temperature operation period, the lowering of the multiplication factor can be recovered.

What is claimed is:

1. A fuel assembly for a nuclear reactor having a number of fuel rods arranged in a channel box surrounded by a water gap, comprising:
   a plurality of first fuel rods arranged in a peripheral portion of said channel box which faces a water gap through which a control blade is not inserted or drawn out; and
   a plurality of second fuel rods arranged in portions of the channel box other than said peripheral portion and each containing a fissionable material having an atomic number density larger than that of a fissionable material contained in each of said first fuel rods.

2. A fuel assembly for a nuclear reactor wherein a number of fuel rods, each containing a fuel material in a metal cladding tube, are arranged, comprising:
   a plurality of first fuel rods each having a total effective fuel area filled with a fuel material throughout an entire axial length of the cladding tube; and
   at least one second fuel rod having an interposed member in the cladding tube which has a predetermined axial length and in which the enrichment of a fissile nuclide is equal to or less than that of natural uranium, the axial length of said interposed member being equal to or more than the thermal neutron diffusion length during the reactor power operation period, an axial level of the location of the interposed member in the fuel rod being designed so as to occupy a position including an area at which subcriticality is made smaller at a period in which maintenance of reactor shut-down margin is inhibited during a reactor operation period, wherein said second fuel rod is arranged at an outer peripheral portion of the fuel assembly.

3. A fuel assembly according to claim 2, wherein the axial length of said interposed member is less than a length of ⅓ of an axial heat generating portion of the fuel assembly, and the interposed member is disposed at a level over the half length of the heat generating portion from the lower end thereof.

4. A fuel assembly according to claim 2, wherein the majority of said second fuel rods provided with the interposed members are arranged at an outer peripheral portion of the fuel assembly facing a water gap through which a cruciform control blade is not inserted or drawn out.

5. A fuel assembly according to claim 2, wherein the majority of said second fuel rods provided with interposed members are arranged symmetrically at an outer peripheral portion of a fuel assembly of the type in which a control rod formed by bundling rod-shaped absorbing elements into clusters, is dispersively inserted into or drawn out from the fuel assembly.

6. A fuel assembly according to claim 2, wherein at least one of said second fuel rods provided with the interposed members comprises a fuel rod having a first gas plenum as the interposed member and a second gas plenum disposed at a top portion of said fuel rod wherein second gas plenum is reduced in diameter or removed completely so as to enlarge the coolant flow passage area.

7. A fuel assembly according to claim 2, wherein each of said second fuel rods provided with the interposed members comprises an upper half and a lower half, wherein said lower half has an outer diameter larger than that of said upper half.

8. A fuel assembly according to claim 1, wherein said second fuel rods are arranged in a side portion of said channel box which faces a water gap through which a control blade is inserted or drawn out.

9. A fuel assembly according to claim 2, wherein said interposed member has an axial length less than $\frac{1}{3}$ of the axial length of said effective fuel area.

10. A fuel assembly according to claim 2, wherein a central portion of said interposed member is disposed at an axial position apart from the lower end of said effective fuel area by a distance of $\frac{3}{4}$ of the axial length of said effective fuel area.

11. A fuel assembly for a nuclear reactor having a number of fuel rods arranged in a channel box surrounded by a water gap, comprising:
 a plurality of first fuel rods arranged in a peripheral portion of said channel box which faces a water gap through which a control blade is not inserted or drawn out; and
 a plurality of second fuel rods arranged in portions of the channel box other than said peripheral portion, wherein said second fuel rods have an average enrichment larger than the average enrichment of said first fuel rods.

* * * * *